United States Patent
Horn et al.

(10) Patent No.: US 10,743,251 B2
(45) Date of Patent: Aug. 11, 2020

(54) SUPPORT FOR MULTIPLE ACCESS MODES FOR HOME BASE STATIONS

(75) Inventors: Gavin B. Horn, La Jolla, CA (US); Osok Song, San Diego, CA (US); Ramachandran Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/607,899

(22) Filed: Oct. 28, 2009

(65) Prior Publication Data

US 2010/0112980 A1 May 6, 2010

Related U.S. Application Data

(60) Provisional application No. 61/110,436, filed on Oct. 31, 2008, provisional application No. 61/140,591, filed on Dec. 23, 2008.

(51) Int. Cl.
*H04W 48/20* (2009.01)
*H04W 8/02* (2009.01)
*H04W 48/02* (2009.01)

(52) U.S. Cl.
CPC .................. *H04W 48/20* (2013.01)

(58) Field of Classification Search
CPC ..... H04W 48/00; H04W 48/02; H04W 48/10; H04W 48/16; H04W 48/18; H04W 48/20;
(Continued)

(56) References Cited

U.S. PATENT DOCUMENTS

| 6,657,538 B1 | 12/2003 | Ritter |
| 2006/0123083 A1 | 6/2006 | Goutte et al. |

(Continued)

FOREIGN PATENT DOCUMENTS

| CN | 101136826 A | 3/2008 |
| CN | 101187294 A | 5/2008 |

(Continued)

OTHER PUBLICATIONS

Huawei, Semi Open Access Issues (UTRA & eUTRA), Aug. 18, 2008, 3GPP TSG-RAN WG2, Meeting #63 R2-083996.*

(Continued)

*Primary Examiner* — George Eng
*Assistant Examiner* — Hung K Du
(74) *Attorney, Agent, or Firm* — Qualcomm Incorporated

(57) ABSTRACT

Systems and methodologies are described that facilitate supporting multiple access modes for a base station in a wireless communication environment. The base station can leverage hybrid, closed, or open access mode. A whitelist of a mobile device that successfully registers on the base station can be selectively updated to include a CSG ID of the base station. For example, the CSG ID of the base station can be added to the whitelist when the base station operates in closed access mode, while adding the CSG ID can be skipped when the base station operates in hybrid access mode. According to another example, the CSG ID can be selectively added based upon a received accept cause value. Additionally or alternatively, a CSG ID and an access mode indicator can be transmitted from a base station to a network node for implementing access control and/or paging optimization at the network node.

16 Claims, 17 Drawing Sheets

(58) Field of Classification Search
CPC ..... H04W 60/00; H04W 60/02; H04W 60/04;
H04W 36/00; H04W 36/0072; H04W
36/0077; H04W 36/04; H04W 36/08;
H04W 36/14; H04W 36/34; H04W 36/36;
H04W 36/365; H04W 12/00; H04W
12/08; H04W 8/04; H04W 60/005; H04W
84/045; H04W 8/02
USPC ... 455/434, 435.1, 435.2, 435.3, 456.1, 458,
455/436, 432.1, 448, 449; 370/331, 328,
370/352, 310, 338, 329
See application file for complete search history.

(56) References Cited

U.S. PATENT DOCUMENTS

| | | | |
|---|---|---|---|
| 2007/0184825 A1 | 8/2007 | Lim et al. | |
| 2007/0232325 A1 | 10/2007 | Oshime et al. | |
| 2007/0268908 A1 | 11/2007 | Linkola et al. | |
| 2007/0297524 A1 | 12/2007 | Jones et al. | |
| 2008/0077995 A1 | 3/2008 | Curnyn | |
| 2008/0207170 A1* | 8/2008 | Khetawat | H04W 60/005 455/411 |
| 2008/0214220 A1 | 9/2008 | Beziot et al. | |
| 2008/0220782 A1 | 9/2008 | Wang et al. | |
| 2008/0267153 A1* | 10/2008 | Mukherjee et al. | 370/338 |
| 2009/0070694 A1* | 3/2009 | Ore et al. | 715/764 |
| 2009/0093232 A1 | 4/2009 | Gupta et al. | |
| 2010/0069119 A1* | 3/2010 | Mueck et al. | 455/561 |
| 2010/0075670 A1* | 3/2010 | Wu | 455/434 |
| 2010/0105377 A1* | 4/2010 | Iwamura | H04W 24/08 455/424 |
| 2010/0110945 A1* | 5/2010 | Koskela et al. | 370/310 |
| 2010/0227611 A1 | 9/2010 | Schmidt et al. | |
| 2010/0265827 A1 | 10/2010 | Horn et al. | |
| 2011/0205954 A1 | 8/2011 | Gorokhov et al. | |
| 2011/0269460 A1* | 11/2011 | Dalsgaard et al. | 455/435.1 |

FOREIGN PATENT DOCUMENTS

| | | |
|---|---|---|
| CN | 101287294 A | 10/2008 |
| CN | 101296451 A | 10/2008 |
| JP | 2010525752 A | 7/2010 |
| JP | 2011501917 | 1/2011 |
| RU | 2216114 C2 | 11/2003 |
| WO | WO2006037361 | 4/2006 |
| WO | WO-08112161 | 2/2009 |
| WO | WO2009034076 A2 | 3/2009 |
| WO | 2009115897 A1 | 9/2009 |

OTHER PUBLICATIONS

3GPP: "Technical Specification Group Core Network and Terminals; 3GPP System Architecture Evolution; CT WG1 Aspects (Release 8) TR 24.801 v8.0.1" Oct. 14, 2008, pp. 1-213, XP002566005 Retrieved from the Internet: URL:www.3gpp.org> [retrieved on Jan. 28, 2010] Chapters 10.12.4 and 10.12.4.4.

3rd Generation Partnership Project: "Technical Specification Group Core Network and Terminals; Non-Access-Stratum (NAS) protocol for Evolved Packet System (EPS); Stage 3 (Release 8); 3GPP TS 24.301 v I . I . I" Oct. 28, 2008, pp. 1-177, XP002566004 Retrieved from the Internet: URL:www.3gpp.org> [retrieved on Jan. 28, 2010] Chapters 4.4.3.3,5.2.3.2.3,5.5.1.1,5.5.1.2.4-5,5.5. 3.2.4; p. 16.

3rd Generation Partnership Project;Technical Specification Group Services andSystem Aspects; Architecture aspects of Home NodeB and Home eNodeB (Release 9) 3GPP Standard; 3GPP TR 23.830, SRD Generation Partnership Project (3GPP), Mobile Competence Centre.

International Search Report and Written Opinion—PCT/US2010/031482, International Search Authority—European Patent Office—Aug. 30, 2010.

NTT Docomo et al: "CSG with limited open 1-48 access" 3GPP Draft; R2-075150 CSG With Limited Open Access, SRD Generation Partnership Project (3GPP), Mobile Competence Centre ; 650, Route Des Lucioles ; F-06921 Sophia-Antipolis Cedex ; France, vol. RAN WG2.

Qualcomm Europe et al: "QoS principles for CSG members and non-members at Hybrid access mode HeNBs" 3GPP Draft; R3-091022, SRD Generation Partnership Project (3GPP), Mobile Competence Centre ; 650, Route Mobile Competence Centre, 2009.

Ericsson: "QoS principles in Hybrid 3,23 access cell" 3GPP Draft; R3-090832, SRD Generation Partnership Project (3GPP), Mobile Competence Centre ; 650, Route Des Lucioles ; F-06921 Sophia-Antipolis Cedex ; France, No. Seoul, Korea; Mar. 18, 2009.

Huawei: "A method of white 1 i st management" 3GPP Draft; CI-083297, 3rd Generation Partnership Project (3GPP), Mobile Competence Centre ; 650, Route Des Lucioles ; F-06921 Sophia-Antipolis Cedex ; France, No. Budapest, Hungary; Aug. 11, 2008, XP050308514 [retrieved on Aug. 11, 2008] chapter 10.12.4.x.

NTT Docomo et al: "CSG with limited open 1-48 access" 3GPP Draft; R2-075150 CSG With Limited Open Access, SRD Generation Partnership Project (3GPP), Mobile Competence Centre ; 650, Route Des Lucioles ; F-06921 Sophia-Antipolis Cedex ; France, vol. RAN WG2, Nov. 2007.

NTT Docomo et al: "CSG with limited open access" 3GPP Draft; R2-075150 CSG With Limited Open Access, 3rd Generation Partnership Project (3GPP), Mobile Competence Centre ; 650, Route Des Lucioles ; F-06921 Sophia-Antipolis Cedex ; France, vol. RAN WG2, No. Jeju; Nov. 12, 2007, XP050137597 [retrieved on Nov. 12, 2007] the whole document.

Panasonic et al: "Support for Manual CSG whitelist update" 3GPP Draft; R2-086191, 3rd Generation Partnership Project (3GPP), Mobile Competence Centre ; 650, Route Des Lucioles ; F-06921 Sophia-Antipolis Cedex ; France, No. Prague, Czech Republic; Nov. 4, 2008, XP050321226 [retrieved on Nov. 4, 2008] the whole document.

Qualcomm Europe et al: "QoS principles for CSG members and non-members at Hybrid access mode HeNBs" 3GPP Draft; R3-091022, SRD Generation Partnership Project (3GPP), Mobile Competence Centre ; 650, Route Des Lucioles ; F-06921 Sophia-Antipolis Cedex ; Fra., May 2009.

Qualcomm Europe: "Update of allowed CSG list after successful manual selection of a CSG cell in a different PLMN" 3GPP Draft; CI-093863 Rev of CI-093534 CSG 24.301, 3rd Generation Partnership Project (3GPP), Mobile Competence Centre ; 650, Route Des Lucioles ; F-06921 Sophia-Antipolis Cedex ; France, No. Sevilla; Aug. 24, 2009, XP050382752 [retrieved on Aug. 31, 2009] Title, Reasons for change, chapter 5.5.1.2.4.

Qualcomm Europe: "Update of allowed CSG list after successful manual selection of a CSG cell in a different PLMN" 3GPP Draft; CI-093864-Rev-0F_CI-093536-24008—Manual-CSG-Selection, 3rd Generation Partnership Project (3GPP), Mobile Competence Centre ; 650, Route Des Lucioles ; F-06921 Sophia-Antipolis Cedex ; France, No. Sevilla; Aug. 24, 2009, XP050382753 [retrieved on Aug. 31, 2009] Title, Reason for change, Summary of change, Consequences if not approved, Chapters 4.4.4.6, 4.7.5.1.3 and last paragraph of Chapter 4.7.3.1.3.

Qualcomm Europe: "UTRA HNB Idle Mode (Re)selection and UE Access Control" 3GPP Draft; R2-083392, 3rd Generation Partnership Project (3GPP), Mobile Competence Centre ; 650, Route Des Lucioles ; F-06921 Sophia-Antipolis Cedex ; France, vol. RAN WG2, No. Warsaw, Poland; Jun. 24, 2008, XP050140786 [retrieved on Jun. 24, 2008] the whole document.

Telecom Italia et al: "EMM reject cause for CSG and Allowed CSG list update procedures" 36PP Draft; CI-084475, 3rd Generation Partnership Project (3GPP), Mobile Competence Centre ; 650, Route Des Lucioles ; F-06921 Sophia-Antipolis Cedex ; France, No. Phoenix; Oct. 13, 2008, XP050309525 [retrieved on Oct. 13, 2008] Reason for change, chapters 3.1, 5.5.1.2.4-5.

T-Mobile: "Update of CSG list in manual mode" 3GPP Draft; CI-090867, 3rd Generation Partnership Project (3GPP), Mobile Competence Centre ; 650, Route Des Lucioles ; F-06921 Sophia-

(56) References Cited

OTHER PUBLICATIONS

Antipolis Cedex ; France, No. San Antonio; Feb. 24, 2009, XP050311240 [retrieved on Feb. 24, 2009] Title, Reason for Change, chapter 4.4.4.6.
Vodafone: "Requirements for Hybrid Access 5,25,36, Mode and RAN2 Impacts" 46 3GPP Draft; R2-092122, SRD Generation Partnership Project (3GPP), Mobile Competence Centre ; 650, Route Des Lucioles ; F-06921 Sophia-Antipolis Cedex ; France, No. Seoul, Korea, Mar. 2009.
Qualcomm Europe, Signalling support for open HeNB deployments, 3GPPTSG-RAN WG2 #63, Aug. 12, 2008, http://www.3gpp.org/ftp/tsg_ran/WG2_RL2/WSGR2_63/Docs/R2-083883.zip.
Motorola et al., "Clarification of Home NodeB Classes", 3GPP TSG-SA1 #42, S1-083248, Oct. 20, 2008.
Taiwan Search Report—TW098136940—TIPO—Jan. 20, 2014.
Huawei: "Semi Open access Issues (UTRA & eUTRA)", 3GPP TSG-RAN WG2 Meeting #63, R2-083996, Aug. 18, 2008.
International Search Report and the Written Opinion—PCT/US2009/062876, International Search Authority—European Patent Office—Feb. 15, 2010.
International Search Report and Written Opinion—PCT/US2010/031482, International Search Authority—European Patent Office—30/08/2010.
Qualcomm Europe: "UE Registration and Access Control for UTRA HNBs", 3GPP TSG-RAN WG3 Ad Hoc, R3-081688, Jun. 11, 2008.
Support Open Hybrid Access Mode for H(e)NB, Huawei, 3GPP TSG RAN WG3 Meeting #63bis R3-090807.
European Search Report—EP14181974—Search Authority—Berlin—May 28, 2015.
Huawei: "Semi Open access Issues (UTRA & EUTRA)", 3GPP Draft; R2-093996 R2#63 Semi Open Access & Open Access Issues (Open Access Issues (Utra & Eutra), RAN WG2, Jeju; Aug. 12, 2008 (Aug. 12, 2008), XP050450890, [retrieved on Aug. 12, 2008].
3GPP: "LS on HNB/HeNB Open Access Mode", R2-084521, 3GPP TSG RAN WG2 Meeting #63, Jeju, Korea, Aug. 18-22, 2008, pp. 2.
3GPP TS 22.220 V0.4.0 (2008-09): 3rd Generation Partnership Project; Technical Specification Group Services and System Aspects; Service requirements for Home NodeBs and Home eNodeBs (Release 9), 2008, 14 pages.
European Search Report—EP4181976—Search Authority—Berlin—May 20, 2015.
Taiwan Search Report—TW104100560—TIPO Feb. 4, 2016.
3GPP TS 23.401 V9.2.0 (Sep. 2009), "3rd Generation Partnership Project; Technical Specification Group Services and System Aspects; General Packet Radio Service (GPRS) enhancements for Evolved Universal Terrestrial Radio Access Network (E-UTRAN) access (Release 09)", Oct. 1, 2009, pp. 18-32, 55-110.
Qualcomm Europe, Support for Open/Closed/Hybrid Access Mode H(e)NBs in CT1[online], 3GPP TSG-CT WG1#56, 3GPP, Nov. 14, 2008, C1-084841, [Oct. 29, 2018], URL: http://www.3gpp.org.ftp/tsg_ct/WG1_mm-cc-sm_ex-CN1/TSGC1_56/Docs/C1-84841.zip.

\* cited by examiner

SUPPORT FOR MULTIPLE ACCESS MODES FOR HOME BASE STATIONS

CLAIM OF PRIORITY UNDER 35 U.S.C. §119

The present Application for Patent claims priority to Provisional Application No. 61/110,436 entitled "METHOD, APPARATUS, AND SYSTEM TO ENABLE SUPPORT FOR MULTIPLE ACCESS MODES FOR HOME BASE STATIONS" filed Oct. 31, 2008, and Provisional Application No. 61/140,591, entitled "METHOD, APPARATUS, AND SYSTEM TO ENABLE SUPPORT FOR MULTIPLE ACCESS MODES FOR HOME BASE STATIONS" filed Dec. 23, 2008. The aforementioned Provisional Applications are assigned to the assignee hereof and hereby expressly incorporated by reference herein.

BACKGROUND

Field

The following description relates generally to wireless communications, and more particularly to supporting multiple access modes for base stations in a wireless communication environment.

Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Heterogeneous wireless communication systems commonly can include various types of base stations, each of which can be associated with differing cell sizes. For instance, macro cell base stations typically leverage antenna(s) installed on masts, rooftops, other existing structures, or the like. Further, macro cell base stations oftentimes have power outputs on the order of tens of watts, and can provide coverage for large areas. The femto cell base station is another class of base station that has recently emerged. Femto cell base stations are commonly designed for residential or small business environments, and can provide wireless coverage to mobile devices using a wireless technology (e.g., 3GPP Universal Mobile Telecommunications System (UMTS) or Long Term Evolution (LTE), 1x Evolution-Data Optimized (1xEV-DO), . . . ) to communicate with the mobile devices and an existing broadband Internet connection (e.g., digital subscriber line (DSL), cable, . . . ) for backhaul. A femto cell base station can also be referred to as a Home Evolved Node B (HeNB), a Home Node B (HNB), a femto cell, or the like. Examples of other types of base stations include pico cell base stations, micro cell base stations, and so forth.

Moreover, base stations can employ differing access modes. Thus, some base stations in heterogeneous wireless communication systems can permit access by substantially any mobile device, while disparate base stations can allow access by authorized mobile device(s) to the exclusion of unauthorized mobile device(s). Conventionally, utilization of different access modes for a base station can detrimentally impact various Non-Access Stratum (NAS) procedures for a mobile device. For instance, access control, paging, and whitelist management can be affected by common approaches when employing different access modes.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with supporting multiple access modes for a base station in a wireless communication environment. The base station can leverage hybrid, closed, or open access mode. A whitelist of a mobile device includes the list of the Closed Subscriber Group (CSG) Identifiers (IDs), with which the mobile device can determine if it can access a cell broadcasting a CSG ID. The whitelist of a mobile device can be selectively updated to include a CSG ID of the base station after the UE successfully registers on the base station. For example, the CSG ID of the base station can be added to the whitelist when the base station operates in closed access mode, while adding the CSG ID can be skipped when the base station operates in hybrid access mode. According to another example, the CSG ID can be selectively added based upon a received accept cause value. Additionally or alternatively, a CSG ID or an access mode indicator can be transmitted from a base station to a network node for implementing access control and/or paging optimization at the network node.

According to related aspects, a method is provided that includes performing manual CSG selection with a mobile device to select a cell of a base station advertising a CSG identified by a CSG ID and determining whether the base station permits access to the cell for members of the advertised CSG or permits access to members and non-members of the advertised CSG. The method also includes initiating registration at the cell of the selected base station and determining whether to update a whitelist to include the CSG ID when the registration is successful and the CSG ID is absent from the whitelist of the mobile device.

Another aspect relates to a wireless communications apparatus. The wireless communications apparatus can include at least one processor configured to perform manual CSG selection and register at a selected base station corresponding to an advertised CSG recognized by a CSG ID. The at least one processor is further configured to identify whether the manually selected base station operates in one of hybrid access mode or closed access mode and select whether to add the CSG ID to a whitelist of a mobile device when registration with the selected base station is successful and the CSG ID is absent from the whitelist.

Yet another aspect relates to an apparatus. The apparatus includes means for performing manual CSG selection and means for registering at a selected base station associated with an advertised CSG identified by a CSG ID. The apparatus also includes means for adding the CSG ID to a whitelist upon successful registration when the selected base station operates in closed access mode and the CSG ID is absent from the whitelist.

Still another aspect relates to a computer program product, which can have a computer-readable medium including code for causing at least one computer to effectuate manual CSG selection and code for causing at least one computer to register at a selected base station associated with an advertised CSG identified by a CSG ID. The computer-readable medium can also comprise code for causing at least one computer to detect whether the selected base station operates in one of hybrid access mode or closed access mode and code for causing at least one computer to include the CSG ID within a whitelist upon successful registration when the selected base station operates in closed access mode and the CSG ID is determined as absent from the whitelist.

Moreover, an additional aspect relates to an apparatus including a selection component that performs manual CSG selection and a registration component that initiates registering at a selected base station associated with an advertised CSG identified by a CSG ID. The apparatus further includes a mode detection component that recognizes whether the manually selected base station operates in one of hybrid access mode or closed access mode and a list management component that updates a whitelist to include the CSG ID upon successful registration when the manually selected base station operates in closed access mode and the CSG ID is absent from the whitelist, and inhibits updating the whitelist when the manually selected base station operates in hybrid access mode.

According to another aspect, a method is provided that includes initiating registration with a mobile device at a base station advertising a CSG identified by a CSG ID that permits access to members and non-members of the CSG and receiving an indication in a response from the registration that specifies whether the mobile device is a member of the advertised CSG. The method also includes determining whether to update a whitelist to include the CSG ID based at least in part on the indication.

Another aspect relates to a wireless communications apparatus. The wireless communications apparatus can include at least one processor configured to register with a base station advertising a CSG recognized by a CSG ID absent from a whitelist of a mobile device. The at least one processor is further configured to control updating of the whitelist as a function of a response received during registering with the base station that indicates whether to add or forgo adding the CSG ID to the whitelist of the mobile device.

Yet another aspect relates to an apparatus. The apparatus includes means for registering with a base station advertising a CSG identified by a CSG ID absent from a whitelist. The apparatus also includes means for managing updating of the whitelist as a function of a registration response that indicates that a mobile device is one of a member of the CSG or a non-member of the CSG.

Still another aspect relates to a computer program product, which can have a computer-readable medium including code for causing at least one computer to effectuate manual CSG selection and code for causing at least one computer to register with a base station advertising a CSG identified by a CSG ID that permits access to members and non-members of the CSG. The computer-readable medium can also comprise code for causing at least one computer to control inclusion of a CSG ID of the base station into a whitelist of a mobile device based upon a registration response that signifies that the mobile device is one of a member of the CSG or a non-member of the CSG.

Moreover, an additional aspect relates to an apparatus including a selection component that chooses a base station advertising a CSG identified by a CSG ID that permits access to members and non-members of the CSG. The apparatus can further include a registration component that initiates registering on the base station and a list management component that selectively updates a whitelist to include the CSG ID as a function of a received registration response that signifies that a mobile device is one of a member of the CSG or a non-member of the CSG.

According to a further aspect, a method is provided that includes transmitting a CSG ID from a base station to a network node, wherein the network node performs at least one of access control or paging optimization. The method also includes transmitting an access mode indicator with the CSG ID from the base station to the network node.

Another aspect relates to a wireless communications apparatus. The wireless communications apparatus can include at least one processor configured to send a CSG ID from a base station to a network node, wherein the network node performs at least one of access control or paging optimization. The at least one processor is further configured to send an access mode indicator with the CSG ID from the base station to the network node.

Yet another aspect relates to an apparatus. The apparatus includes means for transmitting a CSG ID from a base station to a network node. The apparatus also includes means for transmitting an access mode indicator with the CSG ID from the base station to the network node.

Still another aspect relates to a computer program product, which can have a computer-readable medium including code for causing at least one computer to receive a request from a mobile device at a base station. The computer-readable medium can also comprise code for causing at least one computer to transmit a CSG ID associated with the base station and an access mode indicator associated with the base station with the request to a network node, wherein the network node performs at least one of access control or paging optimization.

Moreover, an additional aspect relates to an apparatus including a request receiving component that obtains a request from a mobile device at a base station. The apparatus can further include a forwarding component that transmits the request, a CSG ID associated with the base station and an access mode indicator associated with the base station to a network node that effectuates at least one of access control or paging optimization.

According to yet another aspect, a method is provided that includes receiving a CSG ID corresponding to a base station from the base station at a network node. The method also includes receiving an access mode indicator corresponding to the base station with the CSG ID from the base station at the network node.

Another aspect relates to a wireless communications apparatus. The wireless communications apparatus can include at least one processor configured to obtain a CSG ID corresponding to a base station at a network node. The at least one processor is further configured to obtain an access mode indicator corresponding to the base station with the CSG ID at the network node.

Yet another aspect relates to an apparatus. The apparatus includes means for receiving a CSG ID corresponding to a base station at a network node. The apparatus also includes means for receiving an access mode indicator corresponding to the base station with the CSG ID at the network node.

Still another aspect relates to a computer program product, which can have a computer-readable medium including code for causing at least one computer to receive a CSG ID corresponding to a base station at a network node. The computer-readable medium can also comprise code for causing at least one computer to receive an access mode indicator corresponding to the base station with the CSG ID at the network node.

Moreover, an additional aspect relates to an apparatus including an information collection component that receives a CSG ID and an access mode indicator from a base station. The apparatus can further include a selective analysis component that detects whether to evaluate the CSG ID received from the base station as a function of the access mode indicator received from the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
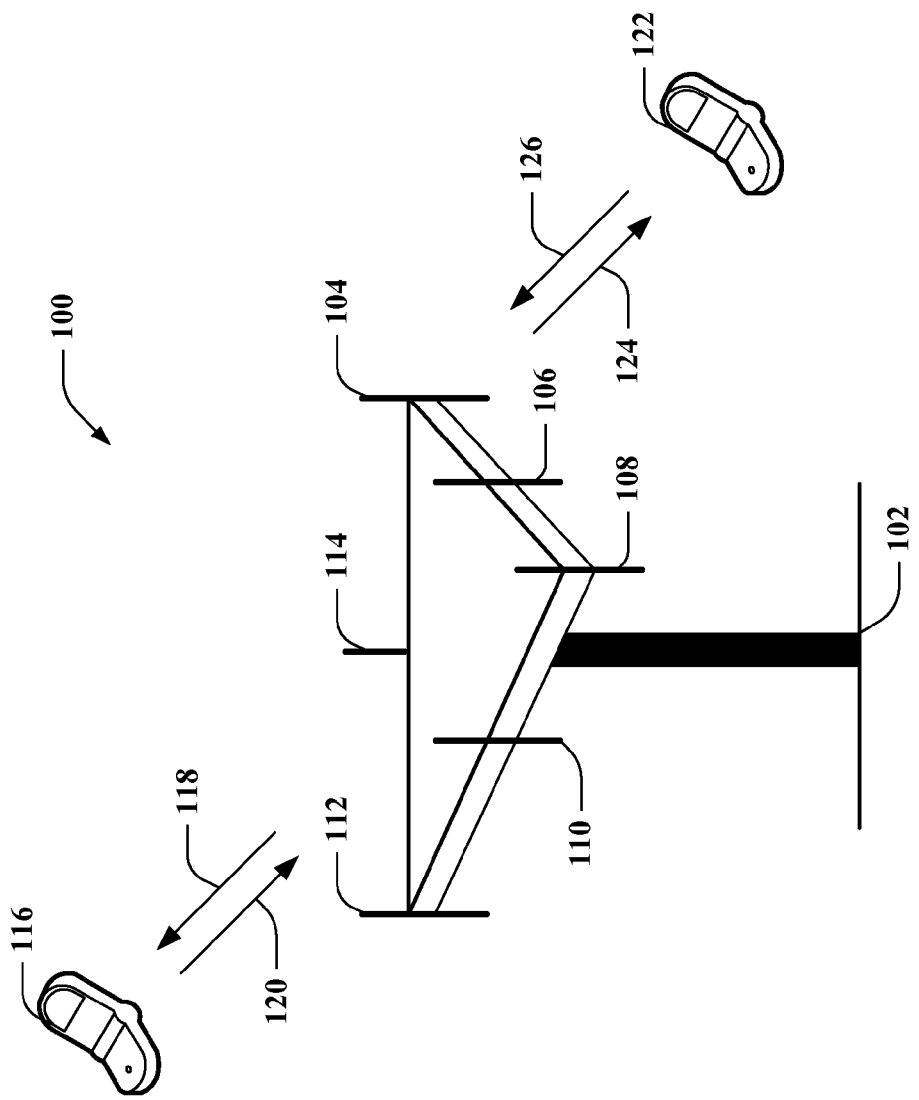
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, an Evolved Node B (eNode B, eNB), a femto cell, a pico cell, a micro cell, a macro cell, a Home Evolved Node B (HeNB), a Home Node B (HNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and Ultra Mobile Broadband (UMB) are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

It is contemplated that base station 102 can be any type of base station (e.g., macro cell base station, micro cell base station, pico cell base station, femto cell base station, . . . ). Further, base station 102 can operate in a particular access mode from a set of possible access modes. The set of possible access modes can include closed access mode, hybrid access mode, and open access mode. When employing closed access mode, base station 102 can operate as a Closed Subscriber Group (CSG) base station where a select group of users identified by a CSG Identifier (ID) are allowed to access such base station. Further, when utilizing hybrid access mode, base station 102 can operate as a hybrid base station (e.g., base station 102 advertises its CSG ID while allowing access to non-CSG members and in addition to CSG members, . . . ). In hybrid access mode, substantially any user can be allowed to access such base station, but a CSG ID can be advertised to allow special privileges to a select group of users such as, for instance, special services, priority, higher rates of service, different access, and so forth. Moreover, when using open access mode, base station 102 can operate as a non-CSG base station (e.g., open base station, . . . ).

Depending upon the access mode employed, base station 102 can be a CSG base station, a hybrid base station, or an open base station. A CSG base station refers to a base station with restricted association accessible by members of a Closed Subscriber Group (CSG) (e.g., non-accessible by non-members of the CSG, . . . ). A CSG base station can also be referred to as a closed base station. A CSG is a set of base stations that share a common access control list of mobile devices. Further, a CSG base station can advertise a corresponding CSG ID (e.g., CSG identity, . . . ), which specifies the CSG corresponding to the CSG base station. An open base station refers to a base station with no restricted association. For instance, an open base station can forgo advertising a CSG ID. Moreover, a hybrid base station can advertise a CSG ID, yet can allow access to both members and non-members of the CSG associated with the CSG ID. For example, a hybrid base station can support preferential billing for members over non-members. According to another example, a hybrid base station can provide priority to members over non-members (e.g., if there is a shortage of resources, then non-members can be dropped prior to members, . . . ). By way of a further example, a hybrid base station can supply a higher level of Quality of Service (QoS) to members versus non-members. It is contemplated, however, that the claimed subject matter is not limited to the aforementioned examples.

Base station 102 can broadcast information to mobile devices 116, 122. The broadcasted information, for instance, can include a CSG ID that identifies a CSG associated with base station 102. Moreover, the broadcasted information can include an access mode indicator that specifies the access mode employed by base station 102. For instance, the access mode indicator can be a CSG indication that distinguishes between base station 102 permitting access to only members of the CSG and permitting access to both members and non-members of the CSG. However, it is to be appreciated that the claimed subject matter is not limited to the foregoing.

System 100 can support whitelist management by mobile devices 116, 122, access control, and/or paging optimizations when base station 102 operates in the particular access mode from the set of possible access modes. For example, system 100 can enable a mobile device (e.g., mobile device 116, mobile device 122, . . . ) to identify whether to include a CSG ID in a whitelist when performing manual selection. By way of another example, when a mobile device (e.g., mobile device 116, mobile device 122, . . . ) requests to access base station 102, then base station 102 can forward a CSG ID (if any) and access mode indicator corresponding to base station 102 to a network node that performs access control. Pursuant to yet another example, the CSG ID (if any) and access mode indicator corresponding to base station 102 can be communicated to a network node that performs paging optimizations (e.g., page filtering at a network entity, . . . ).

A CSG ID is a binary based identifier associated with a subscriber group. The CSG ID can be used to identify a subscriber group (e.g., CSG, . . . ) associated with a CSG base station or a hybrid base station, and can be utilized to support restricted association for a CSG base station. The CSG ID can uniquely identify the CSG associated with the CSG base station or hybrid base station; however, the claimed subject matter is not so limited. Further, the CSG ID associated with a base station typically is not based on an Internet Protocol (IP) address. Further, it is contemplated that more than one base station can share a common CSG ID; however, the claimed subject matter is not so limited.

From a perspective of mobile devices 116, 122, a CSG base station (e.g., base station 102, . . . ) can be a home base station, a guest base station, or an alien base station. A home base station refers to a CSG base station which mobile device 116, 122 is authorized to access. A guest base station refers to a CSG base station which mobile device 116, 122 is temporarily authorized to access. Further, an alien base station refers to a CSG base station which mobile device 116, 122 is not authorized to access.

Moreover, from a standpoint of a CSG base station (e.g., base station 102, . . . ), each mobile device 116, 122 can be a home mobile device, a guest mobile device or an alien mobile device. A home mobile device refers to a mobile device authorized for access. Moreover, a guest mobile device refers to a mobile device temporarily authorized for access. Further, an alien mobile device refers to a mobile device not authorized for access.

Figure 2:
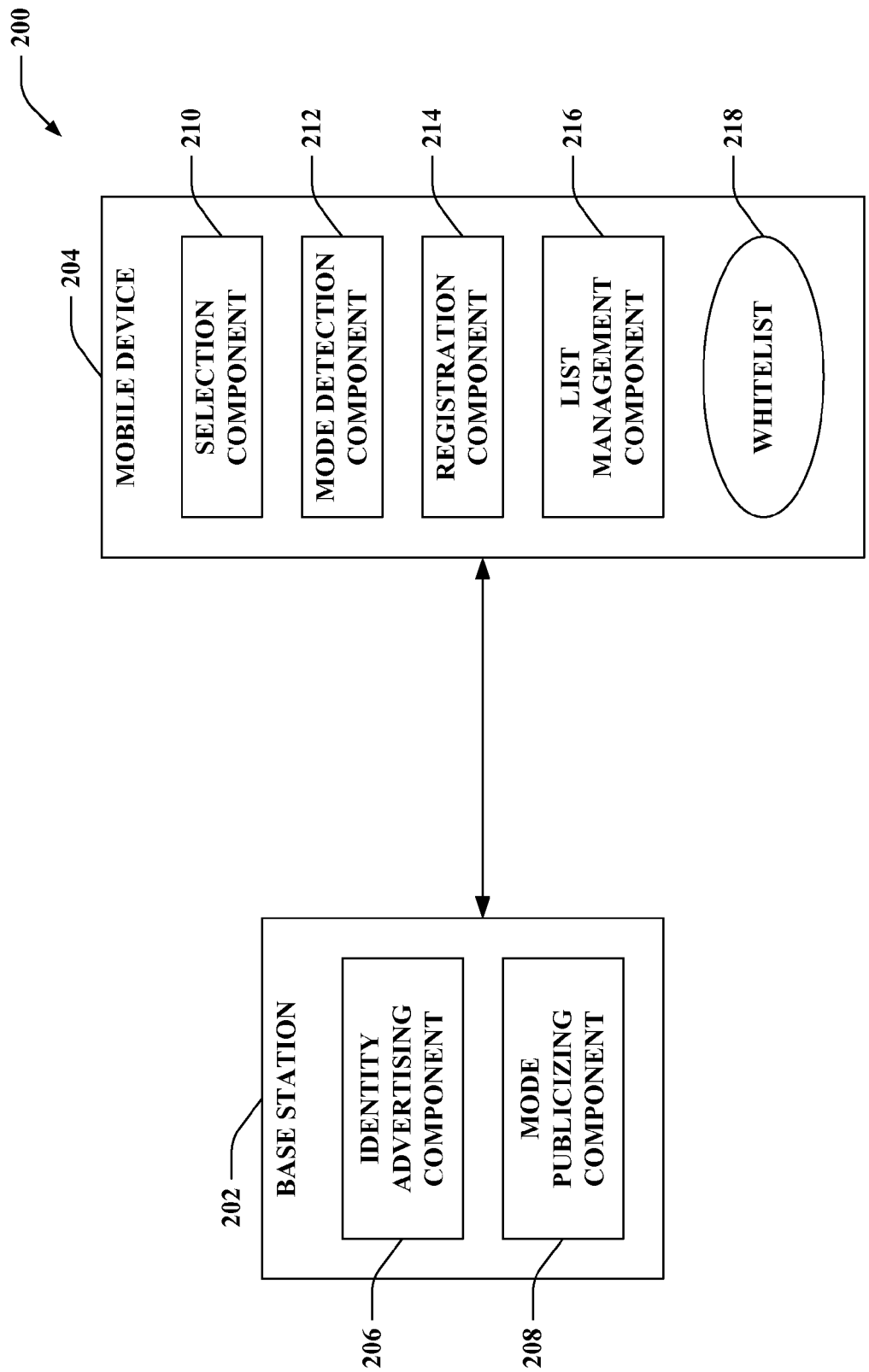
FIG. 2 is an illustration of an example system that supports managing a whitelist of a mobile device that includes Closed Subscriber Group (CSG) Identifiers (IDs) in a wireless communication environment.

Referring to FIG. 2, illustrated is a system 200 that supports managing a whitelist of a mobile device that includes Closed Subscriber Group Identifiers (CSG IDs) in a wireless communication environment. System 200 includes a base station 202 that can transmit and/or receive information, signals, data, instructions, commands, bits, symbols, and the like. Moreover, although not shown, system 200 can include any number of disparate base station(s), which can be substantially similar to base station 202. Base station 202 can communicate with a mobile device 204 via the forward link and/or reverse link. Mobile device 204 can transmit and/or receive information, signals, data, instructions, commands, bits, symbols, and the like. Moreover, although not shown, it is contemplated that any number of mobile devices similar to mobile device 204 can be included in system 200. Further, it is contemplated that base station 202 can be any type of base station (e.g., femto cell base station, pico cell base station, micro cell base station, macro cell base station, . . . ).

According to an example, base station 202 can be a CSG base station, a hybrid base station, or an open base station;

thus, base station 202 can operate in one of closed access mode, hybrid access mode, or open access mode. For instance, if base station 202 is a CSG base station or a hybrid base station, then base station 202 can be associated with a CSG, and the CSG can be identified by a CSG ID. The CSG can be uniquely identified by the CSG ID, for example. According to another example, the CSG can be uniquely identified by the CSG ID in an operator network. Pursuant to another illustration, disparate base station(s) (not shown) included in system 200 can be CSG base station(s), hybrid base station(s), and/or open base station(s). Thus, system 200 can employ a mixed deployment of base stations where some base stations are hybrid and other base stations are CSG or open. Following this illustration, disparate base station(s) that are CSG base station(s) or hybrid base station(s) can be associated with respective CSG(s), and each of the respective CSG(s) can correspond to respective CSG ID(s).

Base station 202 can further include an identity advertising component 206 and a mode publicizing component 208. Identity advertising component 206 can transmit a Closed Subscriber Group (CSG) Identifier (ID) that identifies a CSG corresponding to base station 202. Identity advertising component 206 can send the CSG ID over a downlink. The CSG ID transferred over the downlink can be utilized by mobile device 204 to recognize whether it is a member or a non-member of the CSG corresponding to base station 202. According to an example, an open CSG ID can be defined for an open base station (e.g., if base station 202 is an open base station, . . . ), and the open CSG ID can be advertised by identity advertising component 206; further, every user can be a member of a CSG corresponding to the open CSG ID. By way of another example, a hybrid base station (e.g., if base station 202 is a hybrid base station, . . . ) can use an open CSG ID or a unique CSG ID, which can be disseminated by identity advertising component 206. Following this example, every user can be a member of a CSG associated with the open CSG ID, while a subset of users can be a member of a CSG corresponding to the unique CSG ID. It is to be appreciated, however, that the claimed subject matter is not limited to the aforementioned examples.

Moreover, mode publicizing component 208 can transmit an access mode indicator over the downlink. The access mode indicator can signify the access mode employed by base station 202. For example, the access mode indicator may consist of one or more bits. For instance, the access mode indicator can specify that base station 202 utilizes one of closed access mode, hybrid access mode, or open access mode. By way of another example, the access mode indicator can be used when base station 202 leverages hybrid access mode, and need not be sent by mode publicizing component 208 when base station 202 operates in closed access mode or open access mode. Pursuant to yet another example, the access mode indicator can be a CSG indication sent over the downlink. The CSG indication can distinguish between base station 202 being a CSG base station and a hybrid base station. Further, the CSG indication yielded by mode publicizing component 208 can signify whether base station 202 permits access to only members of the CSG associated with the advertised CSG ID sent by identity advertising component 206 or both members and non-members of the CSG associated with the advertised CSG ID transmitted by identity advertising component 206. In yet another example, the access mode indicator can be of a two bit size, where one bit indicates whether the base station is closed (e.g., allows access only to members of the CSG), and another bit indicates whether the base station advertises a CSG ID. For such an example, hybrid mode can be implied where the base station is not closed and advertises a CSG ID.

Mobile device 204 can include a selection component 210, a mode detection component 212, a registration component 214, and a list management component 216. Selection component 210 can perform manual Closed Subscriber Group (CSG) selection to camp on a manually selected base station (e.g., base station 202, . . . ). However, it is contemplated that selection component 210 can implement automatic CSG selection. When employing manual CSG selection, selection component 210 can search for available base station(s) (e.g., base station 202, disparate base station(s), . . . ). Moreover, selection component 210 can detect a set of available base stations that are selectable, and can receive an input that identifies the manually selected base station from the set of available base stations.

According to an illustration, when searching for available neighbor base station(s), selection component 210 can obtain the advertised CSG ID that identifies the CSG corresponding to base station 202 (e.g., as well as advertised CSG ID(s) of one or more disparate base stations, . . . ). Yet, it is to be appreciated that base station 202 can lack an association with a respective CSG (e.g., if base station 202 employs open access mode, . . . ), and thus, can forgo advertising a CSG ID.

Further, selection component 210 can obtain the input pertaining to the manually selected base station from the set of available base station. For example, the input can be manually yielded by a user. Following this example, selection component 210 can display a list of the available base station in the set for selection (e.g., via a Graphical User Interface (GUI), . . . ), and can receive the input that identifies the manually selected base station in response to the displayed list.

Moreover, mode detection component 212 can recognize a respective access mode utilized by available base station(s). For example, mode detection component 212 can determine whether a manually selected base station (e.g., chosen utilizing selection component 210, . . . ) permits access to members of a CSG or permits access to members and non-members of a CSG.

Accordingly, mode detection component 212 can recognize whether the manually selected base station operates in closed access mode (e.g., allows access to members of the CSG, . . . ) or hybrid access mode (e.g., allows access to members and non-members of the CSG, . . . ).

Mode detection component 212 can detect the access mode utilized by base station 202 based upon an access mode indicator (e.g., CSG indication, . . . ) obtained from base station 202 (e.g., sent over the downlink by mode publicizing component 208, . . . ). The access mode indicator can distinguish between base station 202 permitting access only to members of the CSG identified by the advertised CSG ID and permitting access to both members and non-members of the CSG identified by the advertised CSG ID.

Registration component 214 can initiate registering on the manually selected base station. Registration component 214 can transmit a request to camp on the manually selected base station (e.g., in response to the input collected by selection component 210 that identifies the manually selected base station, . . . ). Further, when registration is successful, registration component 214 can receive an indication that signifies successful camping on the manually selected base station and supplies the CSG ID of the manually selected base station. Moreover, registration component 214 can implement a location registration procedure while registering on the manually selected base station. For example, the location registration procedure can be a Tracking Area Update (TAU) procedure, a Routing Area Update (RAU) procedure, a Location Area Update (LAU) procedure, attach procedure, or the like.

By way of example, the manually selected base station upon which registration component 214 initiates registration can be associated with a CSG identified by a CSG ID not included in a whitelist 218 of mobile device 204. Following this example, the advertised CSG ID obtained from base station 202 can lack a match to a CSG ID included in whitelist 218.

Moreover, list management component 216 can read from and/or write to whitelist 218. List management component 216, for instance, can selectively update whitelist 218 by read from and/or writing to whitelist 218 when registration effectuated by registration component 214 is successful.

According to an example, list management component 216 can update whitelist 218 to add the CSG ID of the manually selected base station (e.g., chosen by selection component 210, . . . ) when the manually selected base station operates in closed access mode (e.g., when registration is successful, . . . ). Moreover, following this example, list management component 216 can inhibit updating whitelist 218 (e.g., skip adding the CSG ID of the manually selected base station, . . . ) when the manually selected base station operates in hybrid access mode (e.g., when registration is successful, . . . ). Hence, list management component 216 can identify whether to update whitelist 218 to include the CSG ID of the manually selected base station when registration is successful as a function of whether mode detection component 212 determines that manually selected base station permits access to member of the CSG (e.g., operates in closed access mode, . . . ) or permits access to members and non-members of the CSG (e.g., operates in hybrid access mode, . . . ). Thus, list management component 216 can enable updating whitelist 218 for a CSG base station while not updating whitelist 218 for a hybrid base station. By not updating whitelist 218 to include a CSG ID for a hybrid base station, system 200 can mitigate incorrectly updating whitelist 218 to include a CSG ID for a CSG of which mobile device 204 (or a user thereof) is a non-member.

Pursuant to the foregoing example, list management component 216 can skip including the CSG ID of a hybrid access mode base station in whitelist 218 of mobile device 204 when manual selection is performed Inhibiting addition of such CSG ID can be because a related CSG can include both hybrid and CSG base stations. If list management component 216 were to instead include the CSG ID in whitelist 218 when reselecting to a hybrid access mode base station, then mobile device 204 may potentially later reselect to a CSG base station in this CSG without registering. If mobile device 204 is not actually a member of the CSG, then mobile device 204 may be unaware it is out of coverage (e.g., not reachable for paging, . . . ) until mobile device 204 reselects or performs an access at the CSG base station. Thus, following this example, list management component 216 adds the CSG ID for the manually selected base station if manual selection is successful performed at a CSG base station for such CSG (e.g., or if updated by application level signaling, . . . ).

By way of another example, list management component 216 can selectively update whitelist 218 to include the CSG ID of the manually selected base station (e.g., upon successful registration, when the manually selected base station operates in hybrid access mode, . . . ) as a function of a received accept cause value that signifies that mobile device 204 is a member of a CSG or a non-member of the CSG. For instance, an accept cause value that indicates whether mobile device 204 is a member of the CSG can be obtained by list management component 216. Further, list management component 216 can update whitelist 218 to include the CSG ID when the accept cause value indicates to add the CSG ID. Moreover, list management component 216 can inhibit updating whitelist 218 to include the CSG ID when the accept cause value indicates to forgo adding the CSG ID. Pursuant to the foregoing example, the accept cause value can be defined to indicate that the CSG ID of a base station operating in hybrid access mode is in a whitelist (e.g., operator CSG list, . . . ) for mobile device 204 in the network for attach, service request, and tracking area updating procedures. Thus, a network node such as, for instance, a Mobility Management Entity (MME), a Mobile Switching Center/Visitor Location Register (MSC/VLR), or a Serving General Packet Radio Service (GPRS) Support Node (SGSN) can include the accept cause value in a NAS signaling response to indicate that mobile device 204 should add the CSG ID to whitelist 218 if it is not already present.

Whitelist 218 can be an allowed CSG list, an operator CSG list, or the like. Whitelist 218 can be stored in memory (not shown) of mobile device 204. According to another example (not shown), whitelist 218 can be retained upon a Subscriber Identity Module (SIM) or Universal SIM (USIM) associated with mobile device 204. Whitelist 218 can also be retained in a network (e.g., managed by a Home Subscriber Server (HSS) (not shown) along with other subscriber profile information, leveraged by a Mobility Management Entity (MME) (not shown) to accept or reject access, . . . ) as described herein to enforce access control. Whitelist 218 can be used to manage cell selection preferences, and can include a set of authorized CSG IDs that a subscriber (e.g., associated with mobile device 204, . . . ) is authorized to use. Whitelist 218 can identify base stations (e.g., closed, hybrid, open, . . . ) that a certain user is allowed to access and/or prefers to access (e.g., for access control and/or special billing purposes, . . . ). For instance, whitelist 218 can include a CSG ID of a hybrid base station if mobile device 204 prefers to access a hybrid base station associated with a CSG with which it is a member as compared to a hybrid base station corresponding to a CSG with which it is a non-member. Further, whitelist 218 can comprise a CSG ID of CSG base station(s). An ordering of CSG IDs in whitelist 218 can indicate priority (e.g., CSG IDs can be stored in whitelist 218 in priority order, . . . ). Additionally, base stations with an entry in whitelist 218 can be preferred to other base stations not included in whitelist 218.

According to another illustration, whitelist 218 can include CSG ID entries of suitable cells. Whitelist 218 can be created based on CSG IDs provisioned. Pursuant to a further example, it is contemplated that a blacklist can be used to complement whitelist 218 (e.g., blacklist used for roaming, . . . ); however, the claimed subject matter is not so limited.

Whitelist 218 can be operator and user controlled. Thus, a subscriber can add and remove entries from whitelist 218. Such user control associated with the operator and user controlled approach can offer flexibility in access control while providing synchronization between whitelist 218 retained by mobile device 204 and the network (e.g., HSS, MME, . . . ). Yet, it is to be appreciated that the claimed subject matter is not so limited as it is contemplated that whitelist 218 can be operator controlled such that an operator can retain control of whitelist 218, while a subscriber can be prohibited from adding or deleting entries in whitelist 218.

For example, whitelist 218 can be retained in memory (not shown) of mobile device 204. Memory can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the subject systems and methods is intended to comprise, without being limited to, these and any other suitable types of memory.

Figure 3:
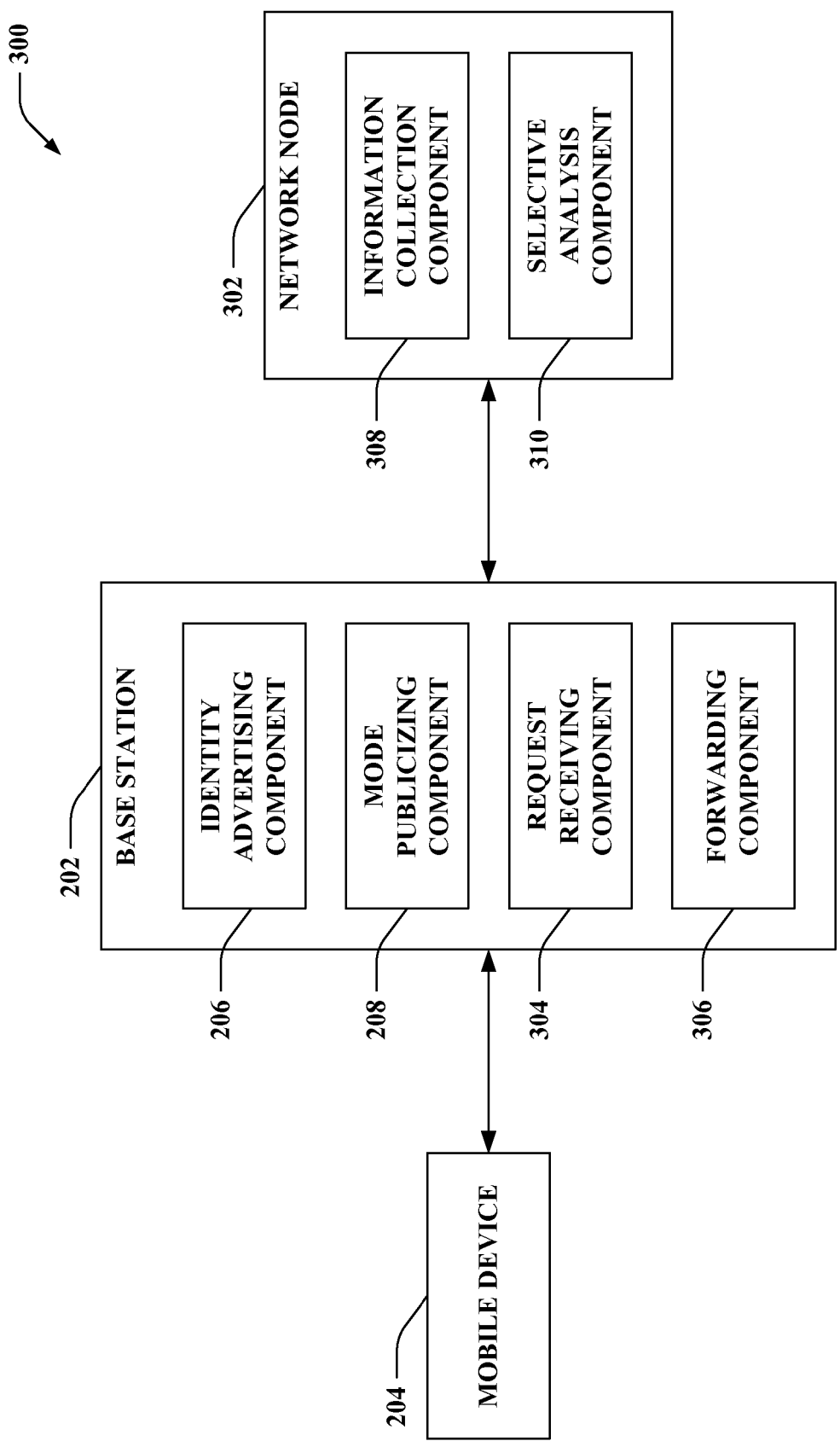
FIG. 3 is an illustration of an example system that indicates an access mode employed by a base station to at least one disparate network entity in a wireless communication environment.

Now referring to FIG. 3, illustrated is a system 300 that indicates an access mode employed by a base station to at least one disparate network entity in a wireless communication environment. System 300 includes base station 202 and mobile device 204. Further, system 300 includes a network node 302. Base station 202 and network node 302 can communicate directly or indirectly; however, the claimed subject matter is not so limited. Network node 302 can effectuate at least one of access control or paging optimization. Network node 302, for example, can be a Mobility Management Entity (MME), a Home Evolved Node B Gateway (HeNB GW), a Home Node B Gateway (HNB GW), a Mobile Switching Center/Visitor Location Register (MSC/VLR), a Serving General Packet Radio Service (GPRS) Support Node (SGSN), or the like.

Base station 202 can include identity advertising component 206, which can transmit a Closed Subscriber Group (CSG) Identifier (ID) that identifies a CSG corresponding to base station 202 to mobile device 204. Further, base station 202 can include mode publicizing component 208, which can transmit an access mode indicator that specifies an access mode utilized by base station 202 over the downlink to mobile device 204. However, it is to be appreciated that the claimed subject matter is not limited to the foregoing.

Moreover, base station 202 can include a request receiving component 304 and a forwarding component 306. Request receiving component 304 can obtain a request from mobile device 204 (e.g., when mobile device 204 initiates establishing a connection, . . . ). For instance, the request obtained by request receiving component 304 from mobile device 204 can be a Tracking Area Update (TAU) request message. Pursuant to an example, an indication of a selected network can be obtained with the TAU request message by request receiving component 304 from mobile device 204. Thus, network node 302 can be identified from a Globally Unique Temporary Identity (GUTI) and from the indication of the selected network. However, according to yet another example, identification of network node 302 need not be effectuated. By way of a further example, the request received by request receiving component 304 from mobile device 204 can be a service request, an attach request, a detach request, and the like; however, it is to be appreciated that the claimed subject matter is not so limited.

Forwarding component 306 can transmit the request to network node 302 (e.g., forwarding component 306 can send the TAU request message to network node 302, . . . ).

Forwarding component 306 can additionally or alternatively transmit a CSG ID associated with base station 202 and an access mode indicator associated with base station 202 to network node 302. According to an example, the access mode indicator sent by forwarding component 306 can specify that base station 202 utilizes one of open access mode, hybrid access mode, or closed access mode. By way of another example, the access mode indicator can be selectively transmitted by forwarding component 306 to signify that base station 202 employs hybrid access mode, while forwarding component 306 can skip transmission of the access mode indicator when base station 202 operates in open access mode or closed access mode.

By way of example, forwarding component 306 can send the CSG ID associated with base station 202 and the access mode indicator associated with base station 202 to network node 302 when mobile device 204 establishes a connection or when base station 202 sets up a connection. For instance, base station 202 can select to establish a connection to network node 302, and can send the CSG ID and access mode indicator in a setup request message to network node 302 utilizing forwarding component 306; however, the claimed subject matter is not so limited.

Network node 302 can further include an information collection component 308 and a selective analysis component 310. Information collection component 308 can receive the CSG ID and the access mode indicator from base station 202 (e.g., sent by forwarding component 306, . . . ). Information collection component 308 can receive the CSG ID and the access mode indicator when mobile device 204 establishes a connection, base station 202 sets up a connection, and so forth.

Moreover, selective analysis component 310 can detect whether to evaluate the CSG ID received from base station 202 as a function of the access mode indicator received from base station 202. For instance, selective analysis component 310 can detect whether to evaluate the CSG ID for at least one of access control or page filtering. Moreover, selective analysis component 310 can detect whether base station 202 operates in closed access mode, hybrid access mode, or open access mode based upon the access mode indicator obtained from base station 202.

According to an example, selective analysis component 310 can detect whether to perform access control for a mobile device (e.g., mobile device 204, . . . ) attempting to access base station 202 as a function of the access mode indicator. Pursuant to this example, selective analysis component 310 can evaluate whether the CSG ID received via information collection component 308 from base station 202 is in a whitelist corresponding to mobile device 204 (e.g., the whitelist can be retained by network node 302, the whitelist can be an operator CSG list, . . . ) when the access mode indicator corresponding to base station 202 identifies that base station 202 operates in closed access mode. Further, following this example, selective analysis component 310 can forgo analysis of the CSG ID when the access mode indicator corresponding to base station 202 identifies that base station 202 operates in open access mode or hybrid access mode. Thus, network node 302 can leverage selective analysis component 310 to determine whether to perform access control based on the CSG ID (e.g., when the CSG ID is present, check whether mobile device 204 is a member of a CSG corresponding to the CSG ID, . . . ) as a function of the access mode indicator.

By way of another example, selective analysis component 310 can selectively implement page filtering as a function of the access mode indicator when identifying whether to page a mobile device at base station 202. Accordingly, selective analysis component 310 can detect whether the CSG ID of base station 202 is in the whitelist corresponding to mobile device 204 when the access mode indicator corresponding to base station 202 identifies that base station 202 operates in closed access mode. If base station 202 operates in closed access mode, mobile device 204 can be paged at base station 202 if the CSG ID of base station 202 is in the whitelist corresponding to mobile device 204 (e.g., mobile device 204 is a member of a CSG corresponding to the CSG ID, ... ). Alternatively, if base station 202 operates in closed access mode, paging of mobile device 204 can be inhibited at base station 202 if the CSG ID of base station 202 is not included in the whitelist corresponding to mobile device 204 (e.g., mobile device 204 is a non-member of the CSG corresponding to the CSG ID, ... ). Further, selective analysis component 310 can skip evaluation of the CSG ID of base station 202 when the access mode indicator corresponding to base station 202 signifies that base station 202 operates in open access mode or hybrid access mode. Thus, if base station 202 operates in hybrid access mode or open access mode, mobile device 204 can be paged at base station 202 regardless whether the CSG ID of base station 202 is included in the whitelist corresponding to mobile device 204 (e.g., mobile device 204 can be a member or a non-member of the CSG corresponding to the CSG ID, ... ).

For access control, information collection component 308 of network node 302 effectuating access control can receive the CSG ID of base station 202 where mobile device 204 is performing the access. Moreover, information collection component 308 can obtain the access mode indicator along with the CSG ID. Thus, selective analysis component 310 can identify whether to check if the CSG ID of base station 202 is in the whitelist of mobile device 204 based on the access mode of base station 202. For closed access mode, network node 302 can perform access control based on the CSG ID, while for open or hybrid access mode evaluation of the CSG ID of base station 202 is not needed. To support access control for different access modes, the access mode indicator (e.g., signifying closed access mode, hybrid access mode, or open access mode, ... ) can be sent by base station 202 (e.g., forwarding component 306, ... ) to network node 302 (e.g., information collection component 308, ... ) when the CSG ID of base station 202 is communicated there between and used for access control. Further, it is contemplated that when operating in open access mode, base station 202 need not have a CSG ID and can send (e.g., with forwarding component 306, ... ) the access mode indicator without a CSG ID; however, the claimed subject matter is not so limited.

When implementing paging optimizations to reduce paging load (e.g., page filtering, ... ), network node 302 performing the page filtering can utilize selective analysis component 310 to detect whether mobile device 204 can camp on base station 202 in idle mode in order to decide whether to send a page request. Network node 302 can be, for instance, a MME, a HNB GW, a HeNB GW, or the like. Network node 302 can determine, for base station 202 operating in closed access mode, whether the CSG ID of base station 202 is in the whitelist of mobile device 204. If the access mode indicator is communicated along with the CSG ID (e.g., by forwarding component 306 of base station 202 to information collection component 308 of network node 302, ... ), then for page filtering network node 302 can recognize whether to check if the CSG ID of base station 202 is in the whitelist of mobile device 204 based on the access mode of base station 202. For closed access mode, network node 302 can perform page filtering based on the CSG ID, while network node 302 need not implement page filtering for open or hybrid access mode (e.g., since any mobile device can register and be paged at a base station operating in open access mode or hybrid access mode, ... ). To support paging for the different access modes, the access mode indicator (e.g., signifying closed access mode, hybrid access mode, or open access mode, ... ) can be sent by base station 202 (e.g., forwarding component 306, ... ) to network node 302 (e.g., information collection component 308, ... ) when the CSG ID of base station 202 is communicated there between and used for page filtering. Further, it is contemplated that when operating in open access mode, base station 202 need not have a CSG ID and can send (e.g., with forwarding component 306, ... ) the access mode indicator without a CSG ID; however, the claimed subject matter is not so limited.

Figure 4:
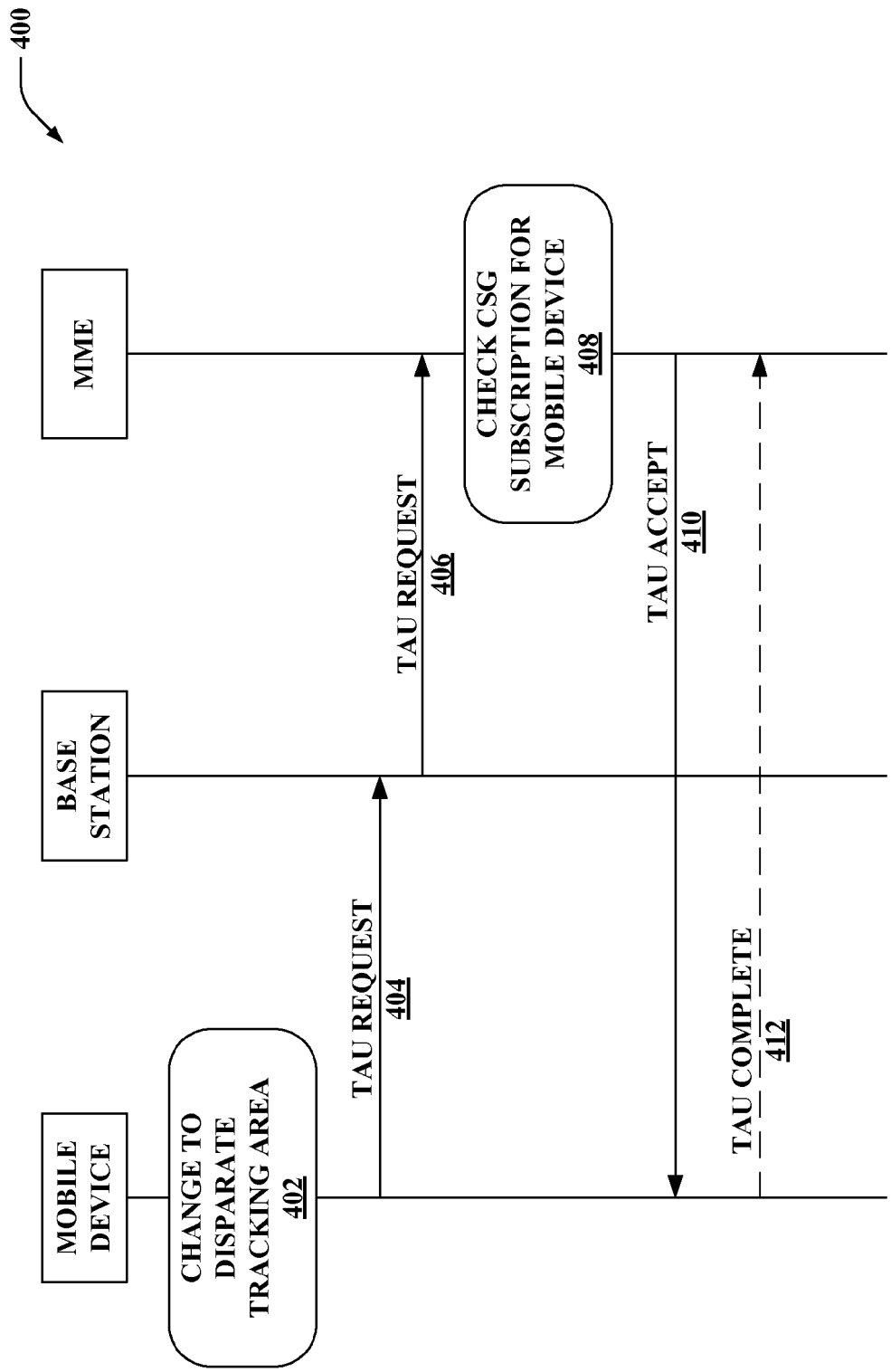
FIG. 4 is an illustration of an example call flow diagram for access control at a CSG cell.

Now turning to FIG. 4, illustrated is an example call flow diagram 400 for access control at a CSG cell. For instance, signaling can be effectuated between a mobile device (e.g., mobile device 204 of FIG. 2, ... ), a base station (e.g., base station 202 of FIG. 2, an HeNB, request receiving component 304 and forwarding component 306 of FIG. 3, ... ), and a Mobility Management Entity (MME) as part of a Tracking Area Update (TAU) procedure. At 402, a mobile device can detect a change to a disparate Tracking Area (TA). At 404, the mobile device initiates the TAU procedure by sending a TAU Request message together with an indication of a selected network to the base station. At 406, the base station can derive a MME from a Globally Unique Temporary Identity (GUTI) and from the indicated selected network. Further, the base station can forward the TAU Request message to the MME along with a CSG ID of the base station and an access mode indicator of the base station. At 408, the MME can check whether a whitelist that is included in subscription data of the mobile device included the CSG ID of the base station by utilizing the CSG ID of the serving cell provided with the TAU Request message as a function of the access mode indicator as described herein. If the CSG ID does not match an entry in the whitelist when the base station operates in closed access mode, then the MME rejects the network access initiated by the mobile device (not shown). Alternatively, if the CSG ID matches an entry in the whitelist when the base station operates in closed access mode (or if the base station operates in open access mode or hybrid access mode), the MME can send a TAU Accept message to the mobile device at 410. Further, optionally at 412, if a GUTI or Non-Access Stratum (NAS) security algorithm is included in the TAU Accept message, then the mobile device can acknowledge the received message by returning a TAU Complete message to the MME.

In the case of a rejected tracking area update operation due to the CSG ID of the CSG cell not being in the whitelist of the mobile device as recognized at 408 when the base station operates in closed access mode, the MME can return a reject message to the mobile device. The reject message can include a cause value #25 (e.g., CSG not allowed in this Public Land Mobile Network (PLMN), ... ) and an S1 connection can be released. Further, upon returning to idle, the mobile device can remove the CSG ID of the CSG cell from the whitelist if present.

According to another example, location registration can be effectuated utilizing Location Area Code (LAC)/Routing Area Code (RAC)/Tracking Area Code (TAC) based registration. To support CSG based access control, each CSG can belong to a unique LAC/RAC/TAC. On selection of a base station (e.g., base station 202 of FIG. 2, ... ), the mobile device performs location registration when such base station belongs to a new LAC/RAC/TAC. It is to be appreciated, however, that the claimed subject matter is not limited to the aforementioned example.

Various examples are presented below. It is to be appreciated that these examples are for illustration purposes, and the claimed subject matter is not limited to the following examples. Further, many of the below examples relate to generation of a preference, selection and/or access of an HeNB; it is contemplated, however, that these examples can be extended to selection and/or access of other types of base stations (e.g., HNBs, macro cell base stations, micro cell base stations, pico cell base stations, . . . ).

By way of example, mobile device 204 (e.g., selection component 210 of FIG. 2, . . . ) can enable selecting (or reselecting) to access base station 202 manually based upon user input in response to a displayed ranking of detected base stations (e.g., base station 202 and disparate base station(s) (not shown), . . . ). For instance, the displayed ranking of detected base stations can include an indication of whether each of the detected base stations permits access to members of a CSG or permits access to members and non-members of the CSG. Pursuant to an illustration, manual HeNB selection or reselection can be effectuated by mobile device 204. In manual HeNB (re)selection, mobile device 204 can scan and present a list of HeNB Identifiers (HeNB IDs) for detected HeNBs. An HeNB ID (e.g., Home Node B Name, . . . ) is a text based identifier associated with a corresponding CSG ID and used for manual cell selection. Thus, pursuant to an example, a target HeNB (e.g., base station 202, . . . ) can be associated with a given HeNB ID. Moreover, the HeNB ID can be unique in a manner that a login ID is unique. The HeNB ID can be sent via SIBn and/or can be configured by a user in combination with OAM; however, the claimed subject matter is not so limited. Further, the list displayed by mobile device 204 can be presented in the following order. HeNB IDs of cells whose CSG IDs are included in a whitelist (e.g., whitelist 218 of FIG. 2, . . . ), if any, can be listed in the same order specified in the whitelist. If more than one HeNB shares the same CSG ID and if their HNB IDs are identical, then mobile device 204 can display the HeNB with the best radio frequency (RF) quality. Further, if more than one HeNB shares the same CSG ID and if their HeNB IDs differ from each other, then mobile device 204 can display the HeNB IDs belonging to the common CSG in an order of their RF quality (from best to worst). Thereafter, the list can include other HeNB IDs, in order of RF quality (from best to worst), including closed HeNBs that are not present in the whitelist. Inclusion of other HeNB IDs not included in the whitelist allows a user to attempt (re)selection of an HeNB in the event that the whitelist stored by mobile device 204 fails to be synchronized with a version of the whitelist retained in the network. Such desynchronization can result from delay or temporary failure in updating the whitelist retained by mobile device 204. Moreover, as part of manual selection, mobile device 204 can indicate whether HeNB is hybrid or closed. Mobile device 204 additionally can display availability of macro coverage and/or relative signal strengths (e.g., signal bars, . . . ) along with the HeNB IDs to aid the user in the selection decision. Upon user selection of an HeNB, mobile device 204 can attempt reselection of the chosen HeNB. Note that depending on channel condition, mobile device 204 may fail to remain on the selected HeNB. After manual selection, automatic (re)selection rules can apply as part of idle mode procedures and can result in (re)selection of a different HeNB. Moreover, if no HeNB is detectable, the manual selection process can end and mobile device 204 can remain on a current cell.

An HeNB can broadcast an HeNB ID in free text format. Mobile device 204 can display the HeNB ID when camping on the cell where it is broadcast. Further, the HeNB ID can be configurable by an administrator of the HeNB. Moreover, the HeNB ID can be associated with the stored CSG IDs.

By way of further example, CSG HeNBs can be identified by a CSG ID for manual selection and provisioning. CSG HeNBs advertising the same CSG ID can have different HeNB IDs. Further, the HeNB ID need not be heard by mobile device 204 for restricted association. Rather, the HeNB ID typically is used for display purposes and manual selection. Moreover, the HeNB ID can be sent out very rarely (e.g., order of seconds, . . . ). Such example can yield advantages related to not needing to hear the HeNB ID to decide to handover in idle or connected state. However, the aforementioned example can result in difficulty associated with provisioning a number manually. Moreover, CSG IDs can be unable to be used to support registration for an enterprise model.

According to another example, automatic base station selection (or reselection) can be effectuated by mobile device 204 (e.g., selection component 210, . . . ). For instance, mobile device 204 can perform automatic HeNB selection or reselection; however, the claimed subject matter is not so limited. In automatic HeNB (re)selection, mobile device 204 can effectuate the following. HeNBs (e.g., identified by an HeNB indicator in SIB11 transmitted by a serving cell, . . . ) can be discovered, and CSG indicators and CSG IDs corresponding to the detected HeNBs can be recognized. The HeNB indicator can differentiate HeNBs from macro eNBs in a neighbor list, and can be set for an entire carrier frequency dedicated for HeNB deployment. Upon recognition of the CSG indicators and the CSG IDs pertaining to the detected HeNBs, measured cells can be ranked. Further, closed HeNBs not in the whitelist can be removed from the ranking without restricting their frequencies of operation. Moreover, a highest ranked cell can be reselected.

Figure 5:
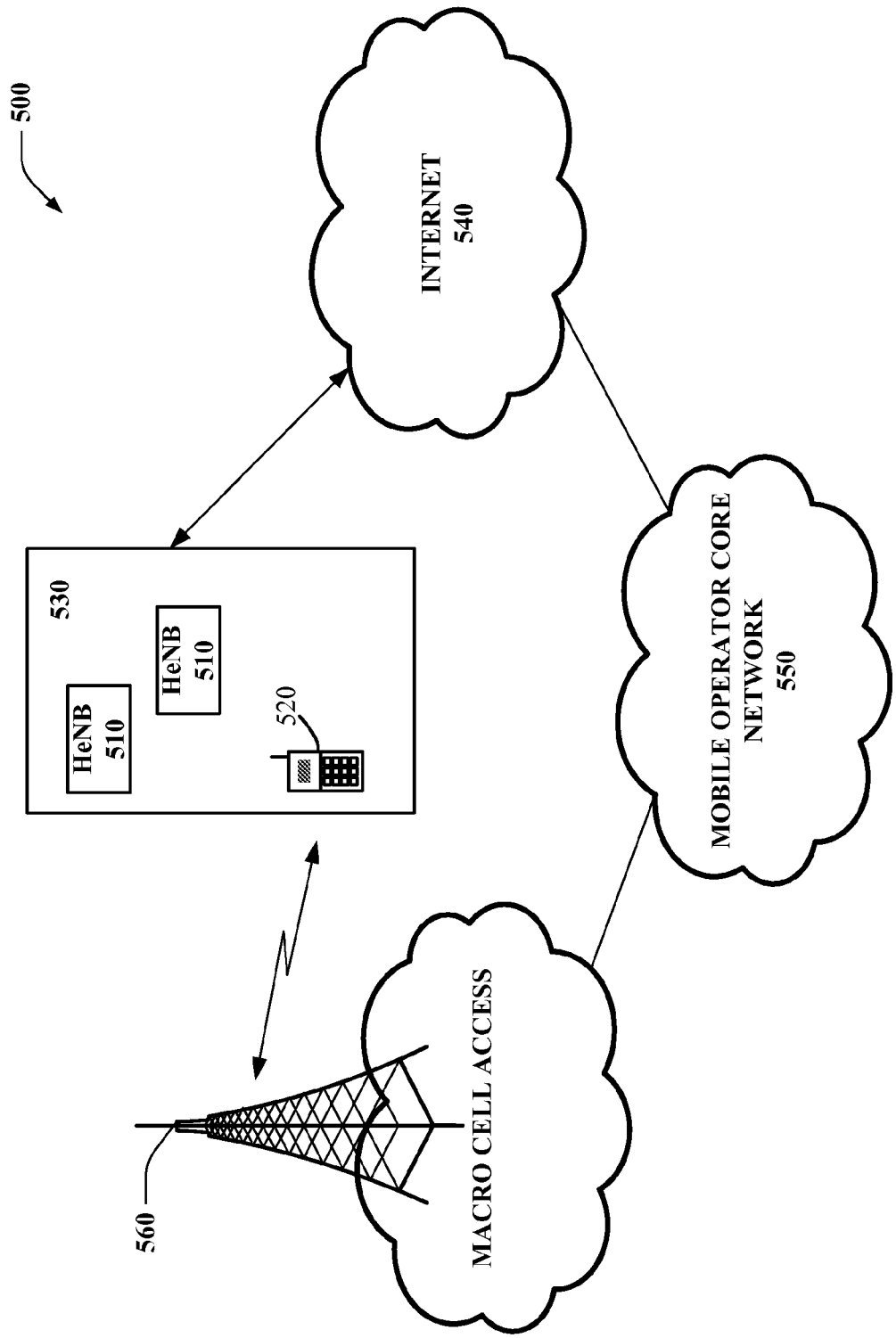
FIG. 5 is an illustration of an example system that enables deployment of access point base stations (e.g., femto cell base stations, . . . ) within a network environment.

FIG. 5 illustrates an exemplary communication system 500 that enables deployment of access point base stations (e.g., femto cell base stations, . . . ) within a network environment. As shown in FIG. 5, system 500 includes multiple femto cell base stations, which can also be referred to as access point base stations, Home Evolved Node B units (HeNBs), Home Node B unit (HNB), femto cells, or the like. The femto cell base stations (HeNBs 510), for example, can each be installed in a corresponding small scale network environment, such as, for example, in one or more user residences 530, and can each be configured to serve associated, as well as alien, mobile device(s) 520. Each HeNB 510 is further coupled to the Internet 540 and a mobile operator core network 550 via a DSL router (not shown) or, alternatively, a cable modem (not shown).

Although embodiments described herein use 3GPP terminology, it is to be understood that the embodiments may be applied to 3GPP (Re199, Re15, Re16, Re17) technology, as well as 3GPP2 (1xRTT, 1xEV-DO Re10, RevA, RevB) technology and other known and related technologies. In such embodiments described herein, the owner of HeNB 510 can subscribe to mobile service, such as, for example, 3G mobile service, offered through the mobile operator core network 550, and mobile device 520 can be capable to operate both in a macro cellular environment via a macro cell base station 560 and in a residential small scale network environment. Thus, HeNB 510 can be backward compatible with any existing mobile device 520. It is contemplated that HeNBs 510 can include CSG HeNB(s), hybrid HeNB(s), and/or open HeNB(s).

Figure 6:
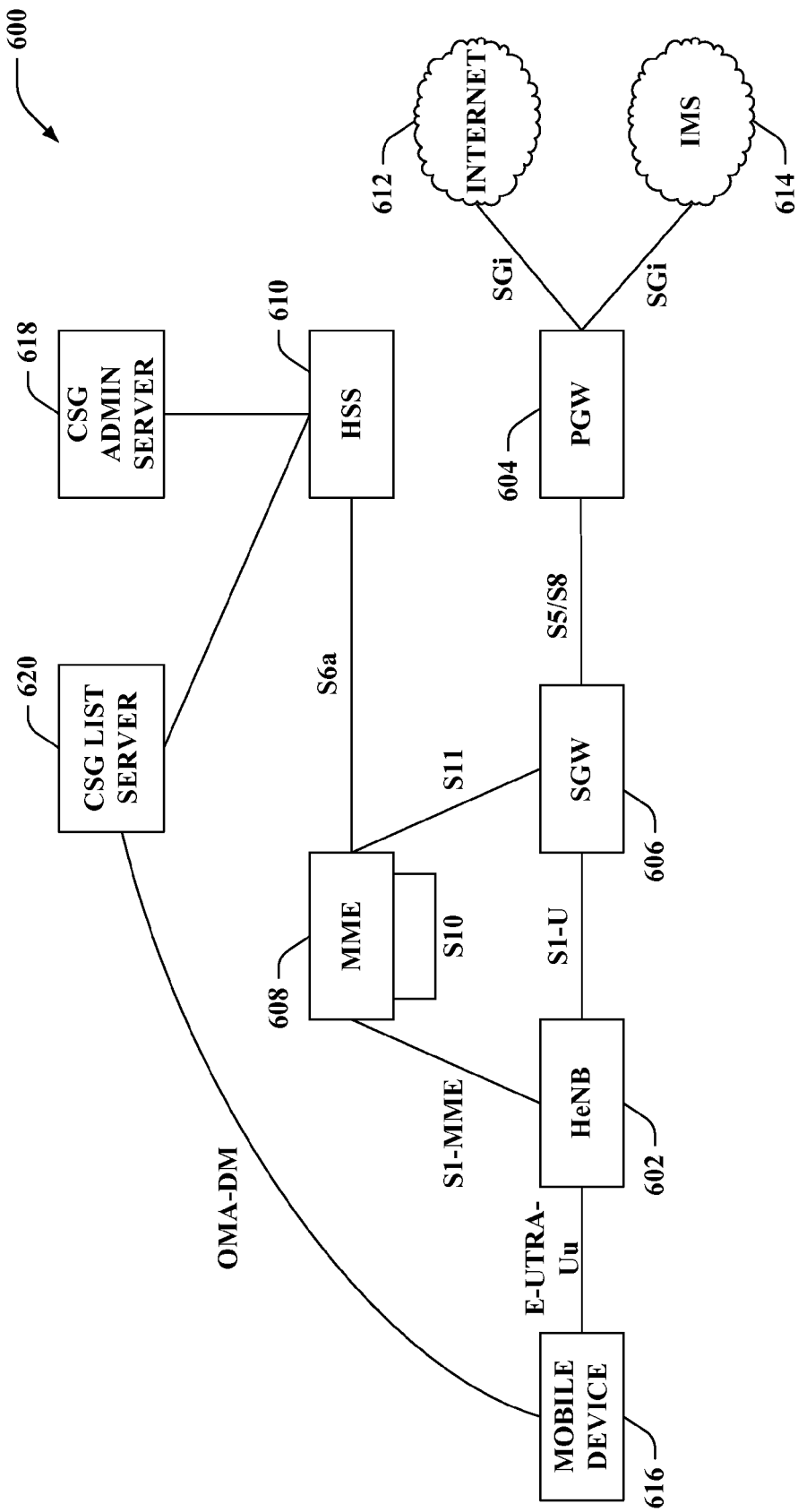
FIG. 6 is an illustration of an example system that provides Closed Subscriber Group (CSG) support in a wireless communication environment.

Now referring to FIG. 6, illustrated is an example system 600 that provides Closed Subscriber Group (CSG) support in a wireless communication environment. System 600 depicts an example architecture model that can be utilized in conjunction with an HeNB 602 (e.g., HeNBs 510 of FIG. 5, base station 202 of FIG. 2, . . . ). It is contemplated, however, that disparate architecture models are intended to fall within the scope of the hereto appended claims. For instance, although not shown, it is contemplated that differing architectures that support utilization of CSGs with a HNB, a macro cell base station, or any other type of base station is intended to fall within the scope of the claimed subject matter.

According to an illustration, HeNB 602 can be located on a user's premises; however, the claimed subject matter is not so limited. HeNB 602 can provide Evolved Universal Terrestrial Radio Access Network (E-UTRAN) eNB functions as well as functions to support HeNB authentication, HeNB registration, and HeNB configuration through Operation and Maintenance (OAM).

HeNB 602 can communicate directly or indirectly with various nodes of a core network (e.g., Evolved Packet Core (EPC), . . . ) in system 600. For instance, the nodes of the core network can include a Packet Data Network Gateway (PGW) 604, a Serving Gateway (SGW) 606, a Mobility Management Entity (MME) 608, and a Home Subscriber Server (HSS) 610. Although not shown, it is contemplated that system 600 can include more than one PGW 604, SGW 606, MME 608, and/or HSS 610.

PGW 604 can interface with external Packet Data Network(s) (PDN(s)) such as, for instance, the Internet 612 and/or an IP multimedia subsystem (IMS) 614. Moreover, although not depicted, PGW 604 can additionally or alternatively interface with an Intranet or any disparate PDN(s). PGW 604, for example, can handle address allocation, policy enforcement, packet classification and routing, and so forth.

SGW 606 is associated with a user plane and is an anchor point for mobility. SGW 606 points to a serving base station (e.g., HeNB 602, disparate HeNB, differing eNB, . . . ) of a user (e.g., employing a mobile device 616, . . . ). Thus, upon handing off to a differing base station, SGW 606 can repoint to the differing base station. Further, SGW 606 can enable data to be routed to the appropriate base station (e.g., HeNB 602, . . . ) serving mobile device 616 at a given time.

MME 608 is associated with a control plane. MME 608 can support control plane signaling for mobility, Quality of Service (QoS) initialization, user authentication, and the like. Further, HSS 610 can store various subscription information such as, for instance, phone numbers, profiles, and the like.

System 600 includes various interfaces between nodes. For instance, an S6a interface can connect MME 608 and HSS 610 and an S5/S8 interface can connect SGW 606 and PGW 604. Further, an S1-U interface can connect HeNB 602 and SGW 606, an S11 interface can couple SGW 606 and MME 608, and an S1-MME interface can connect HeNB 602 and MME 608. Additionally, PGW 604 can connect to PDN(s) (e.g., Internet 612, IMS 614, . . . ) via respective SGi interfaces, and HeNB 602 and mobile device 616 can be coupled via an E-UTRA-Uu interface. Moreover, MME 608 can be associated with an S10 interface.

HSS 610 can also directly or indirectly connect to CSG provisioning network elements, namely a CSG administration server 618 and a CSG list server 620. CSG administration server 618 can support CSG administration functions, which can be utilized to manage a list of subscribers for a CSG (e.g., access control list for the CSG, . . . ). For example, an owner of HeNB 602 can interact with CSG administration server 618 via an interface (e.g., Graphical User Interface (GUI), website, . . . ) to add or remove a user from being included in a CSG associated with HeNB 602. Based upon such changes, CSG administration server 618 can update HSS 610 to adjust subscription information for the user as modified.

Further, CSG list server 620 provides UE CSG provisioning functionality utilized to manage a whitelist (WL) (e.g., allowed CSG list, . . . ) for mobile device 616 (and/or any disparate mobile device(s) (not shown)). CSG list server 620 can inform mobile device 616 that it is a member of a particular group (e.g., particular CSG, . . . ). Further, when a subscription is updated by CSG administration server 618, HSS 610 can store subscription information corresponding to the update. Moreover, updating the subscription information in HSS 610 can trigger a message to be transferred to CSG list server 620, which can cause CSG list server 620 to utilize an Open Mobile Alliance Device Management (OMA-DM) process to downlink the modified subscription information to mobile device 616. Hence, CSG list server 620 can enable synchronizing the subscription information retained by HSS 610 and mobile device 616 (e.g., stored in memory of mobile device 616, retained on a Subscriber Identity Module (SIM) or a Universal SIM (USIM) associated with mobile device 616, . . . ).

Various logical network protocol functions between mobile device 616 and core network elements can be effectuated in system 600 to support CSG. The logical network protocol functions, for instance, can include UE CSG provisioning functions, access control functions, mobility management functions, and CSG administration functions.

UE CSG provisioning functions can manage the whitelist for mobile device 616. The whitelist is a list of CSG IDs; mobile device 616 is able to access CSG cells that have a CSG ID included in the whitelist. The whitelist can be stored in the network in order to perform access control and stored by mobile device 616 to enable selecting a cell to be accessed. The whitelist in the network can be permanently stored in HSS 610, and retrieved by MME 608 for access control during attach, detach, service request, and tracking area updating procedures. The whitelist at mobile device 616 can be stored on a USIM for such mobile device 616 or memory of mobile device 616.

Access control functions can ensure that a mobile device has a valid subscription at a CSG where it performs an access. MME 608 can perform access control for mobile device 616 accessing the network through an CSG cell during attach, detach, service request, and tracking area updating procedures. Further, MME 608 can include a reject cause value in a Non-Access Stratum (NAS) signaling response upon recognizing that mobile device 616 is not allowed in the CSG for attach, service request, and/or tracking area updating procedures.

Further, mobility management functions can be used to keep track of a current location of mobile device 616. The location of mobile device 616 in idle state can be known by the network on a Tracking Area list granularity. Thus, when in idle state, mobile device 616 can be paged in all cells of the Tracking Area list received at a last Tracking Area Update.

Moreover, CSG administration functions can manage the list of subscribers for a CSG. The CSG administration function can be hosted by an operator or a third party. For instance, a single list can control the HeNBs for a CSG. Further, HeNBs advertising the same CSG ID can have a single list of subscribers.

As noted above, HSS 610 can permanently retain CSG subscription information. Further, the CSG subscription information can be retrieved by MME 608 during an attach procedure or tracking area updating procedure as part of a subscription profile of mobile device 616. MME 608 can utilize the retrieved CSG subscription information to perform access control. For instance, MME 608 can perform access control since access control is a NAS level procedure, and MME 608 is the NAS endpoint in the core network. Further, MME 608 can obtain and store a copy of a whitelist for mobile device 616 (e.g., the whitelist can be retained as part of the user's subscription information, . . . ). Moreover, MME 608 can know a CSG ID of a CSG cell where mobile device 616 is performing the access in order to effectuate access control.

Although described herein as being performed at the NAS, it is contemplated that access control for CSGs can be implemented at an Access Stratum (AS). Access control at the AS can be implemented in a Radio Network Controller (RNC) function in HeNB 602 (or in a related function in an HeNB-Gateway (not shown)). It is to be appreciated, however, that the claimed subject matter is not so limited.

Additional examples related to CSG utilization in general are set forth below. It is contemplated that these examples are presented for illustration purposes, and the claimed subject matter is not limited by these examples.

A CSG base station can be associated with various characteristics. For instance, a CSG base station can be deployed on a single frequency or multiple frequencies (e.g., CSG base station/hybrid base station/open base station frequencies can overlap, . . . ). Further, a CSG base station can broadcast sufficient information so that a mobile device can determine that it is a CSG base station, and whether it is a home, guest, or alien base station without access the CSG base station. Moreover, a CSG base station can determine whether a mobile device is a home, guest, or alien mobile device when it attempts access. The CSG base station can support guest mobile device usage, can allow a mobile device to access for emergency services, and alien mobile devices can be rejected in a manner that can cause them not to try to access again. Moreover, a mobile device can determine whether a CSG base station is a home, guest, or alien base station without performing an access. The mobile device can be provisioned with a list of allowed home and guest base stations. The mobile device may not be required to distinguish between a home and guest base station. Further, the mobile device typically should not try to access an alien base station (e.g., other than emergency services, . . . ). Moreover, the mobile device commonly should not camp on the alien base station while in idle state (e.g., unless the alien base station is allowed to page the mobile device, . . . ). The mobile device can have a list of home and guest base stations, which can be independent of PLMN identities.

A CSG base station can support varying types of association. For instance, full association can be provided for home or guest mobile devices at a CSG base station. Such mobile devices with full association can camp on and be paged in idle state and can set up a call/session from the CSG base station (e.g., attach, . . . ). Further, for an alien mobile device at a CSG base station, signaling association or restricted association can be supported. Signaling association (e.g., semi-open, . . . ) can allow a mobile device to camp on and be paged in idle state (e.g., but not access, . . . ) and/or access the alien base station for NAS and/or Radio Resource Control (RRC) control plane signaling (e.g., manage interference in order to access another base station, . . . ). Further, with restricted association, a mobile device typically does not access the alien base station and typically does not camp on such base station in idle state.

Referring to FIGS. 7-10, methodologies relating to supporting multiple access modes in a wireless communication environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 7:
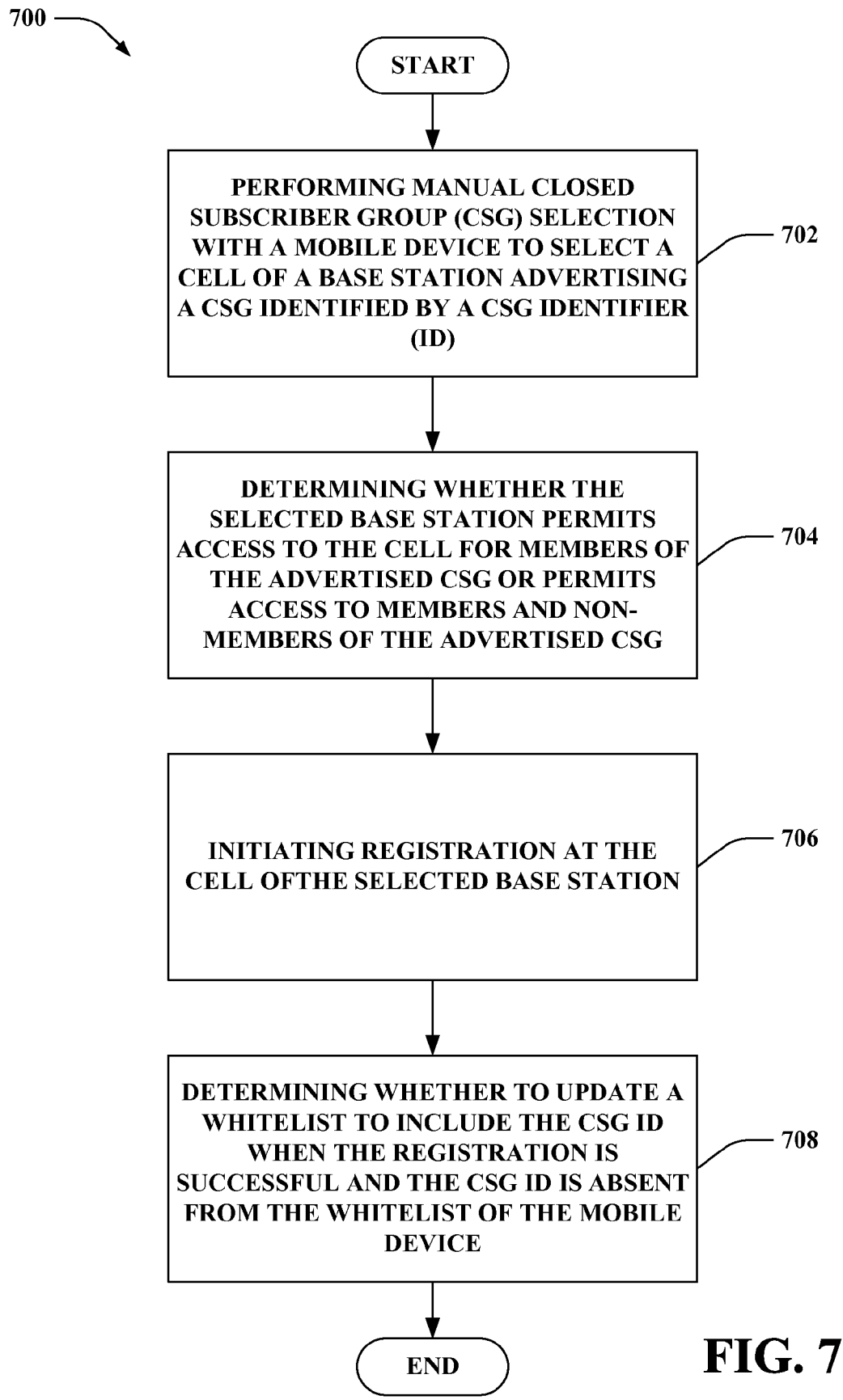
FIG. 7 is an illustration of an example methodology that facilitates managing a whitelist for a mobile device in a wireless communication environment.

Turning to FIG. 7, illustrated is a methodology 700 that facilitates managing a whitelist for a mobile device in a wireless communication environment. At 702, manual Closed Subscriber Group (CSG) selection can be performed with a mobile device to select a cell of a base station advertising a CSG identified by a CSG Identifier (ID). For instance, scanning for available base stations or related cells advertising respective CSGs identified by corresponding CSG IDs can be effectuated. Moreover, a list comprising at least one of the corresponding CSG IDs pertaining to at least one of the available base stations can be displayed. Further, an input that identifies the selected base station from the list of available base stations can be received. Alternatively, it is contemplated that automatic CSG selection can be effectuated; however, the claimed subject matter is not so limited. At 704, whether the selected base station permits access to the cell for members of the advertised CSG or permits access to members and non-members of the advertised CSG can be determined. Such determination can be effectuated, for example, as a function of an advertised CSG indication (e.g., received from the base station, . . . ). Thus, an access mode (e.g., hybrid access mode, closed access mode, open access mode, . . . ) utilized by the selected base station (e.g., for the cell) can be recognized. At 706, registration at the cell of the selected base station can be initiated. Moreover, registration can include transmitting a request to camp on the selected base station, and receiving an indication that signifies successful camping on the manually selected base station. Further, registration can comprise performing a location registration procedure on the selected base station. The location registration procedure, for example, can be a Tracking Area Update procedure, a Routing Area Update procedure, a Location Area Update procedure, and so forth. At 708, whether to update a whitelist to include the CSG ID when the registration is successful and the CSG ID is absent from the whitelist of the mobile device can be determined. By way of example, the whitelist can be an allowed CSG list, an operator CSG list, or the like. The whitelist can be updated by writing to the whitelist. According to an example, the CSG ID of the selected base station can be added to the whitelist upon successful registration when the selected base station operates in closed access mode. By way of another example, addition of the CSG ID of the selected base station to the whitelist upon successful registration can be inhibited when the selected base station operates in hybrid access mode.

Figure 8:
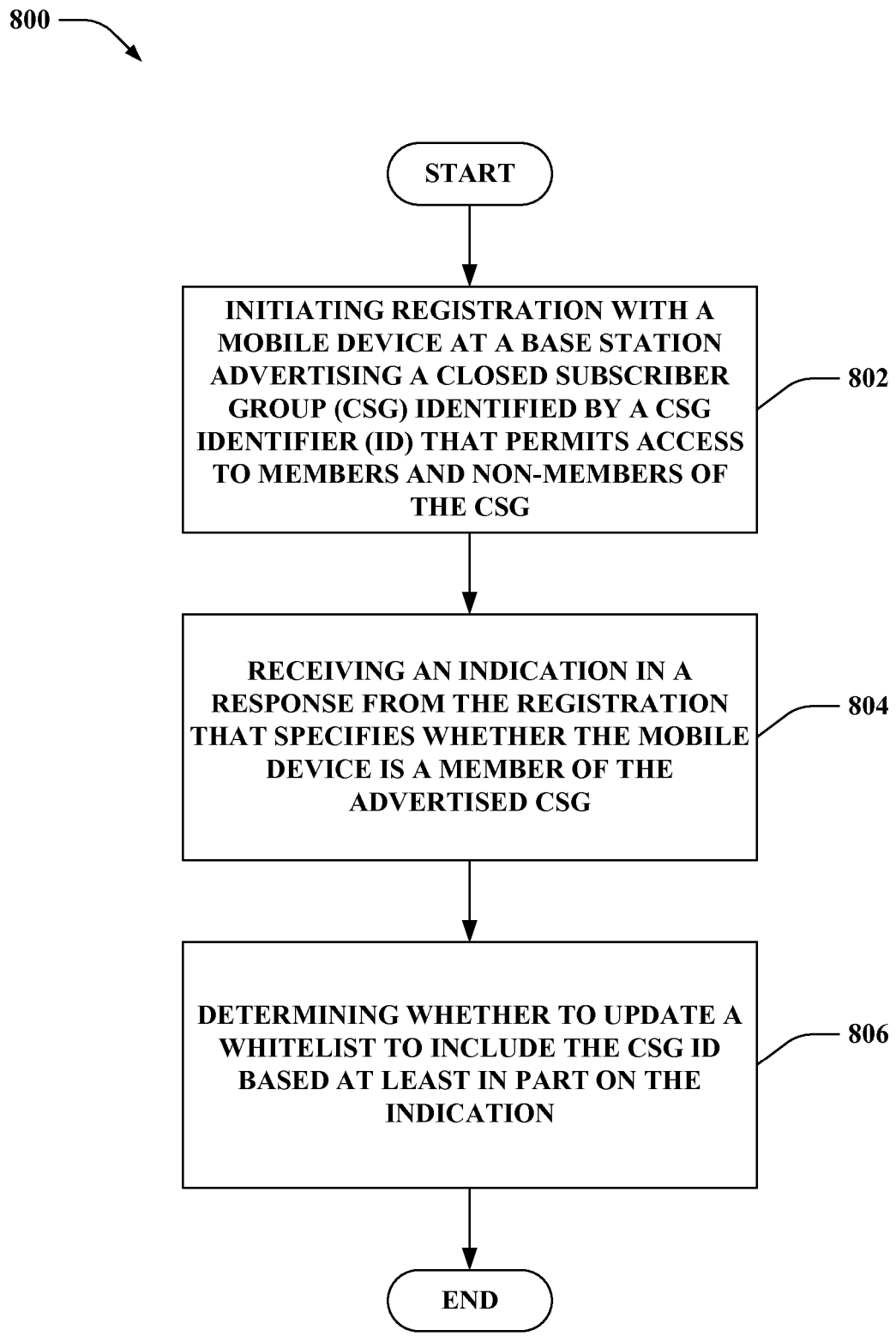
FIG. 8 is an illustration of an example methodology that facilitates controlling updating of a whitelist for a mobile device in a wireless communication environment.

Referring to FIG. 8, illustrated is a methodology 800 that facilitates controlling updating of a whitelist for a mobile device in a wireless communication environment. At 802, registration with a mobile device at a base station advertising a Closed Subscriber Group (CSG) identified by a CSD Identifier (ID) that permits access to members and non-members of the CSG can be initiated. The base station that permits access to members and non-members of the CSG can operate in hybrid access mode. According to an example, the base station can be selected utilizing automatic CSG selection. By way of another example, the base station can be selected utilizing manual CSG selection. Following this example, a set of available base stations that are selectable can be detected, and an input that identifies the base station from the set of available base stations can be received. Moreover, it can be detected that the base station operates in hybrid access mode and permits access to members and non-members of the CSG. Further, registration can include transmitting a request to camp on the base station, and receiving an indication that signifies successful camping on the base station and supplies the CSG ID of the base station. By way of another example, a location registration procedure can be performed to register on the base station. The location registration procedure can be, for instance, a Tracking Area Update procedure, a Routing Area Update procedure, a Location Area Update procedure, or the like. At 804, an indication in a response from the registration that indicates whether a mobile device is a member of the CSG can be received. For example, the response can be an accept cause value, and the accept cause value can correspond to whether the mobile device is a member of the CSG. At 806, a whitelist can be updated to include the CSG ID based at least in part on the indication (e.g., when the accept cause value indicates to add the CSG ID). The whitelist can be, for instance, an allowed CSG list, an operator CSG list, and so forth. Further, updating of the whitelist to include the CSG ID can be inhibited when the accept cause value indicates to forgo adding the CSG ID.

Figure 9:
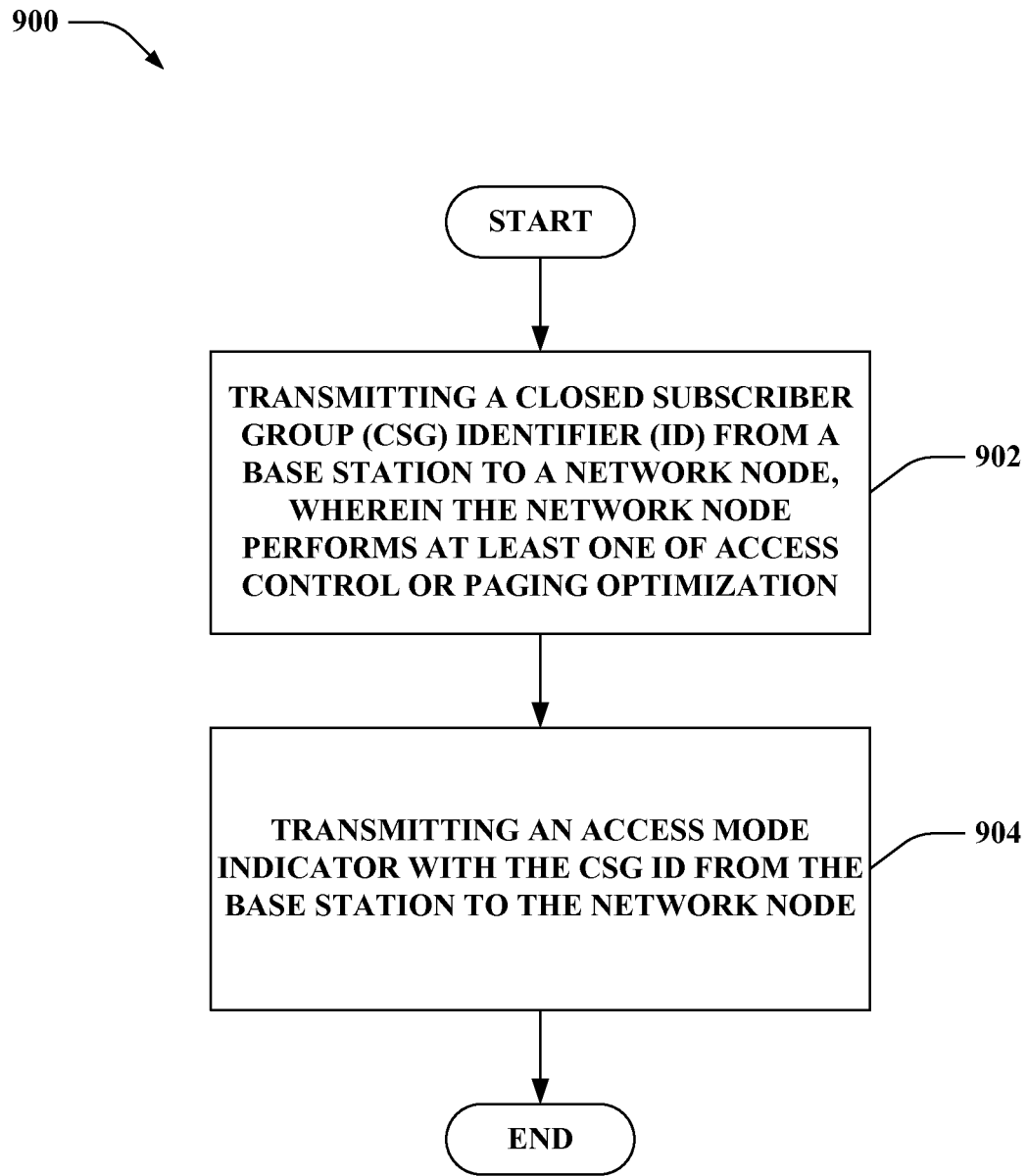
FIG. 9 is an illustration of an example methodology that facilitates supporting access control and/or paging optimization in a wireless communication environment.

Now turning to FIG. 9, illustrated is a methodology 900 that facilitates supporting access control and/or paging optimization in a wireless communication environment. At 902, a Closed Subscriber Group (CSG) Identifier (ID) can be transmitted from a base station to a network node. The network node can perform at least one of access control or paging optimization. By way of illustration, the network node can be a Mobility Management Entity (MME), a Home Evolved Node B Gateway (HeNB GW), a Home Node B Gateway (HNB GW), a Mobile Switching Center/Visitor Location Register (MSC/VLR), a Serving General Packet Radio Service (GPRS) Support Node (SGSN), or the like. At 904, an access mode indicator can be transmitted with the CSG ID from the base station to the network node. For example, the access mode indicator can specify that the base station utilizes open access mode, hybrid access mode, or closed access mode. By way of another example, the access mode indicator can signify that the base station employs hybrid access mode.

Pursuant to an example, a Tracking Area Update (TAU) request message can be received from a mobile device. Moreover, the TAU request message can be forwarded to the network node with the CSG ID of the base station and the access mode indicator. Further, it is contemplated that an indication of a selected network can be received with the TAU request message from the mobile device, and the network node can be identified from a Globally Unique Temporary Identity (GUTI) and from the indication of the selected network. According to another example, a service request, an attach request, and/or a detach request can be received from a mobile device. Following such example, the service request, attach request, and/or detach request can be forwarded to the network node with the CSG ID of the base station and the access mode indicator. By way of yet another example, a selection to establish a connection to the network node can be yielded (e.g., by the base station, . . . ), and the CSG ID and the access mode indicator can be transmitted in a setup request message to the network node.

Figure 10:
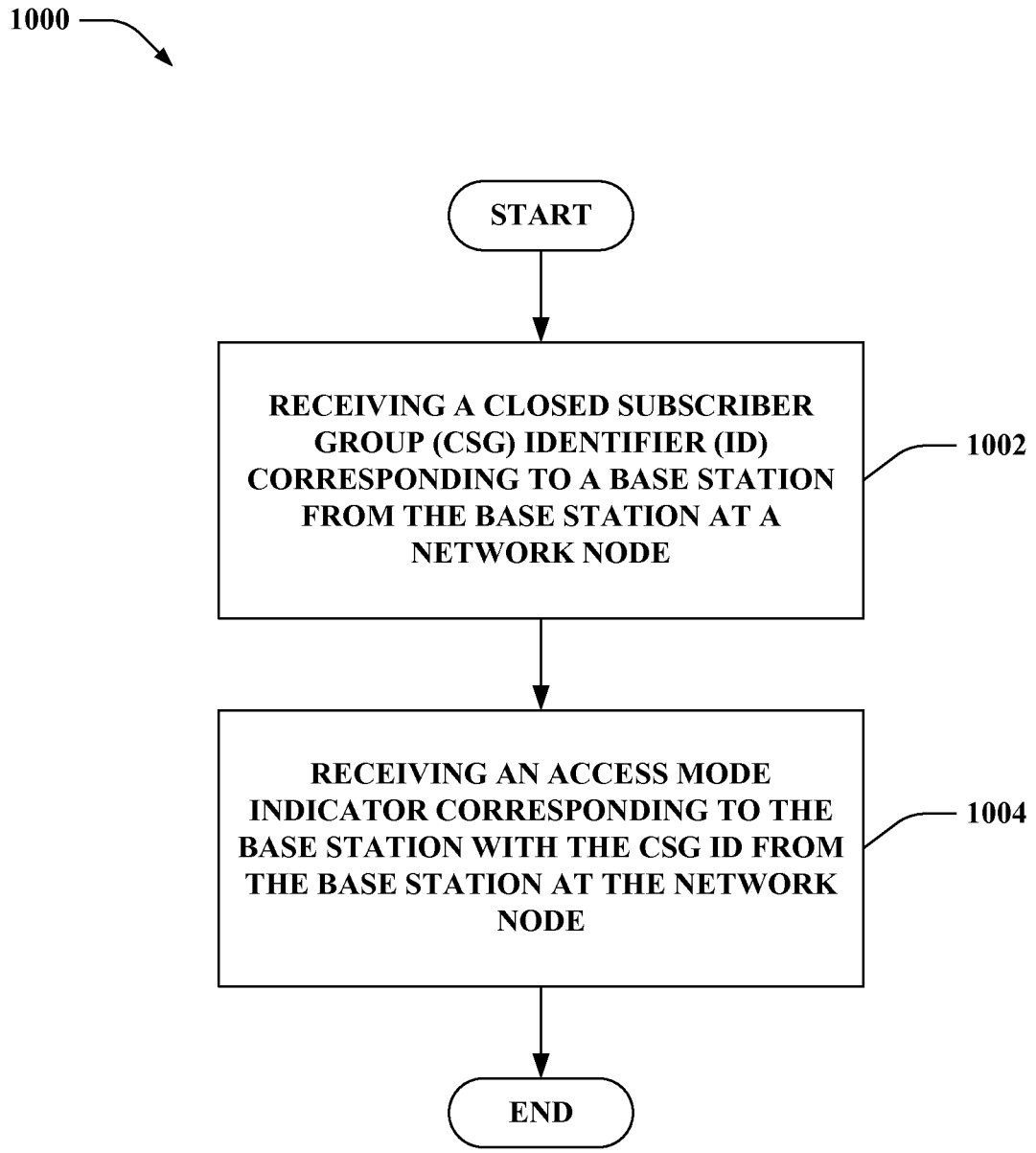
FIG. 10 is an illustration of an example methodology that facilitates implementing access control and/or paging optimization in a wireless communication environment.

Referring to FIG. 10, illustrated is a methodology 1000 that facilitates implementing access control and/or paging optimization in a wireless communication environment. At 1002, a Closed Subscriber Group (CSG) Identifier (ID) corresponding to a base station can be received from the base station at a network node. The network node, for instance, can be a Mobility Management Entity (MME), a Home Evolved Node B Gateway (HeNB GW), a Home Node B Gateway (HNB GW), a Mobile Switching Center/Visitor Location Register (MSC/VLR), a Serving General Packet Radio Service (GPRS) Support Node (SGSN), or the like. At 1004, an access mode indicator corresponding to the base station can be received with the CSG ID from the base station at the network node. By way of illustration, the CSG ID and the access mode indicator can be received when a mobile device establishes a connection, when the base station establishes a connection to the network node, and so forth. Further, the access mode indicator can specify that the base station utilizes open access mode, hybrid access mode, or closed access mode. Pursuant to another example, the access mode indicator can specify that the base station utilizes hybrid access mode.

According to an example, whether to perform access control for a mobile device attempting to access the base station can be detected as a function of the access mode indicator. Following this example, an evaluation of whether the CSG ID is in a whitelist of the mobile device can be effectuated when the access mode indicator corresponding to the base station identifies that the base station operates in closed access mode. Moreover, analysis of the CSG ID can be skipped when the access mode indicator corresponding to the base station identifies that the base station operates in open access mode or hybrid access mode.

By way of yet another example, page filtering can be selectively implemented as a function of the access mode indicator when identifying whether to page a mobile device at the base station. Thus, whether the CSG ID is in a whitelist of the mobile device can be detected when the access mode indicator corresponding to the base station identifies that the base station operates in closed access mode. Moreover, evaluation of the CSG ID can be skipped when the access mode indicator corresponding to the base station signifies that the base station operates in open access mode or hybrid access mode.

It will be appreciated that, in accordance with one or more aspects described herein, inferences can be made regarding effectuating management of a whitelist of a mobile device, implementing access control and/or employing page filtering in a wireless communication environment that supports multiple access modes. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
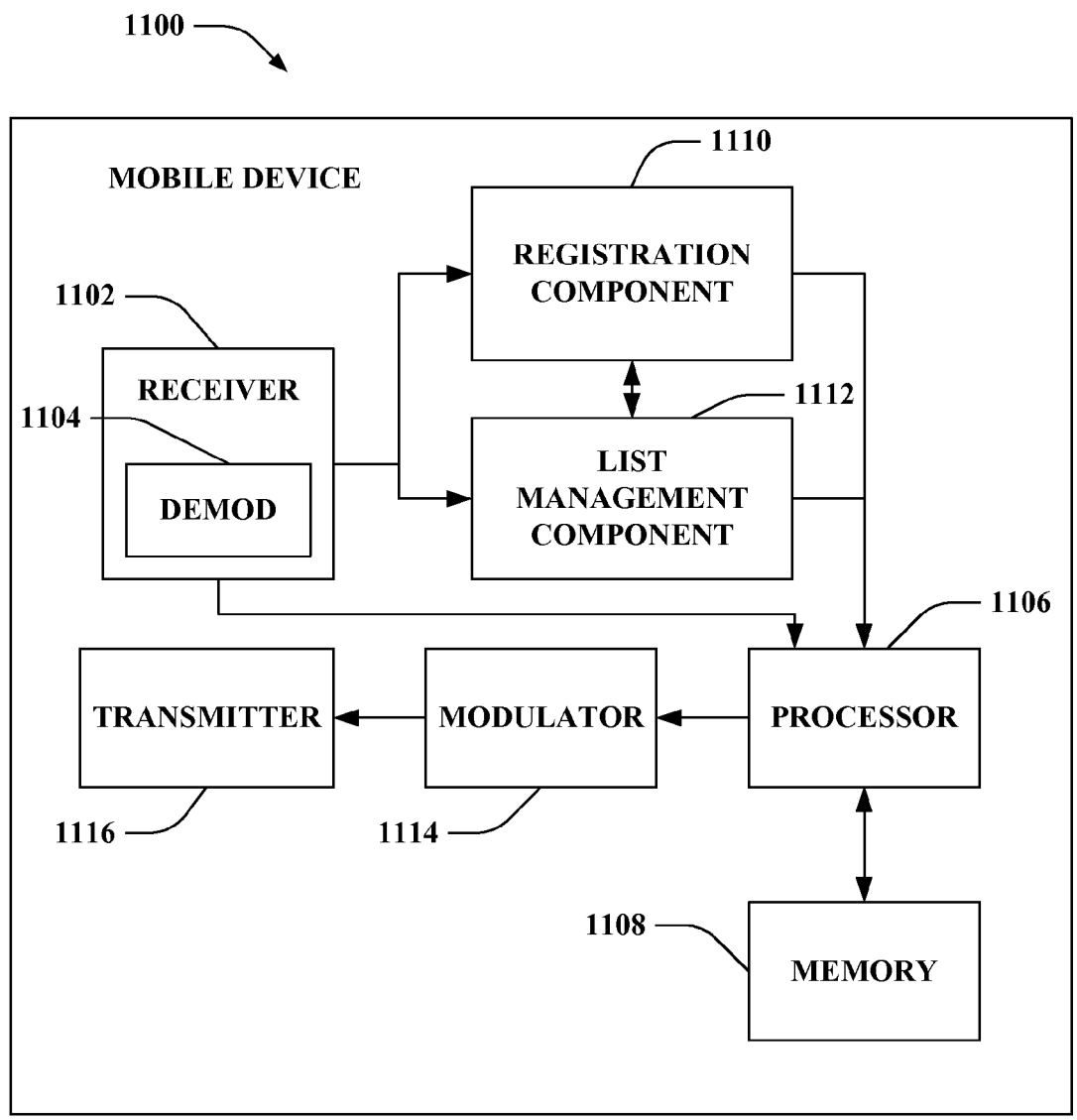
FIG. 11 is an illustration of an example mobile device that manages a whitelist that includes CSG IDs in a wireless communication system.

FIG. 11 is an illustration of a mobile device 1100 that manages a whitelist that includes Closed Subscriber Group (CSG) Identifiers (IDs) in a wireless communication system. Mobile device 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. According to an example, receiver 1102 can obtain an advertised CSG ID that identifies a CSG corresponding to a base station and an access mode indicator that differentiates between the base station operating in hybrid access mode, closed access mode, or open access mode. Processor 1106 can be a processor dedicated to analyzing information received by receiver 1102 and/or generating information for transmission by a transmitter 1116, a processor that controls one or more components of mobile device 1100, and/or a processor that both analyzes information received by receiver 1102, generates information for transmission by transmitter 1116, and controls one or more components of mobile device 1100.

Mobile device 1100 can additionally comprise memory 1108 that is operatively coupled to processor 1106 and that can store data to be transmitted, received data, and any other suitable information related to performing the various actions and functions set forth herein. Memory 1108, for instance, can store protocols and/or algorithms associated with analyzing obtained CSG IDs and access mode indicators. Further, memory 1108 can store protocols and/or algorithms associated with selecting a base station (e.g., via manual or automatic CSG selection, . . . ), determining whether the base station permits access to members of a CSG or permits access to members and non-members of the CSG, initiating registration on the selected base station, and selectively updating a whitelist to include a CSG ID of the base station upon successful registration. Memory 1108 can also include whitelist (e.g., whitelist 218 of FIG. 2, allowed CSG list, . . . ).

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Processor 1106 can be operatively coupled to a registration component 1110 and/or a list management component 1112. Registration component 1110 can be substantially similar to registration component 214 of FIG. 2 and/or list management component 1112 can be substantially similar to list management component 216 of FIG. 2. Registration component 1110 can initiate registering on a base station associated with a CSG identified by a CSG ID not included in the whitelist (e.g., retained in memory 1108, . . . ). Moreover, list management component 216 can selectively update the whitelist. According to an example, list management component 216 can update the whitelist to include the CSG ID upon successful registration when the base station operates in closed access mode and can inhibit updating the whitelist when the base station operates in hybrid access mode. By way of another example, list management component 216 can selectively update the whitelist to include the CSG ID of the base station as a function of a received accept cause value that signifies that mobile device 1100 is a member of the CSG or a non-member of the CSG. Although not shown, it is to be appreciated that mobile device 1100 can further include a selection component (e.g., substantially similar to selection component 210 of FIG. 2, . . . ) and/or a mode detection component (e.g., substantially similar to mode detection component 212 of FIG. 2, . . . ). Mobile device 1100 still further comprises a modulator 1114 and a transmitter 1116 that transmits data, signals, etc. to a base station. Although depicted as being separate from the processor 1106, it is to be appreciated that registration component 1110, list management component 1112 and/or modulator 1114 can be part of processor 1106 or a number of processors (not shown).

Figure 12:
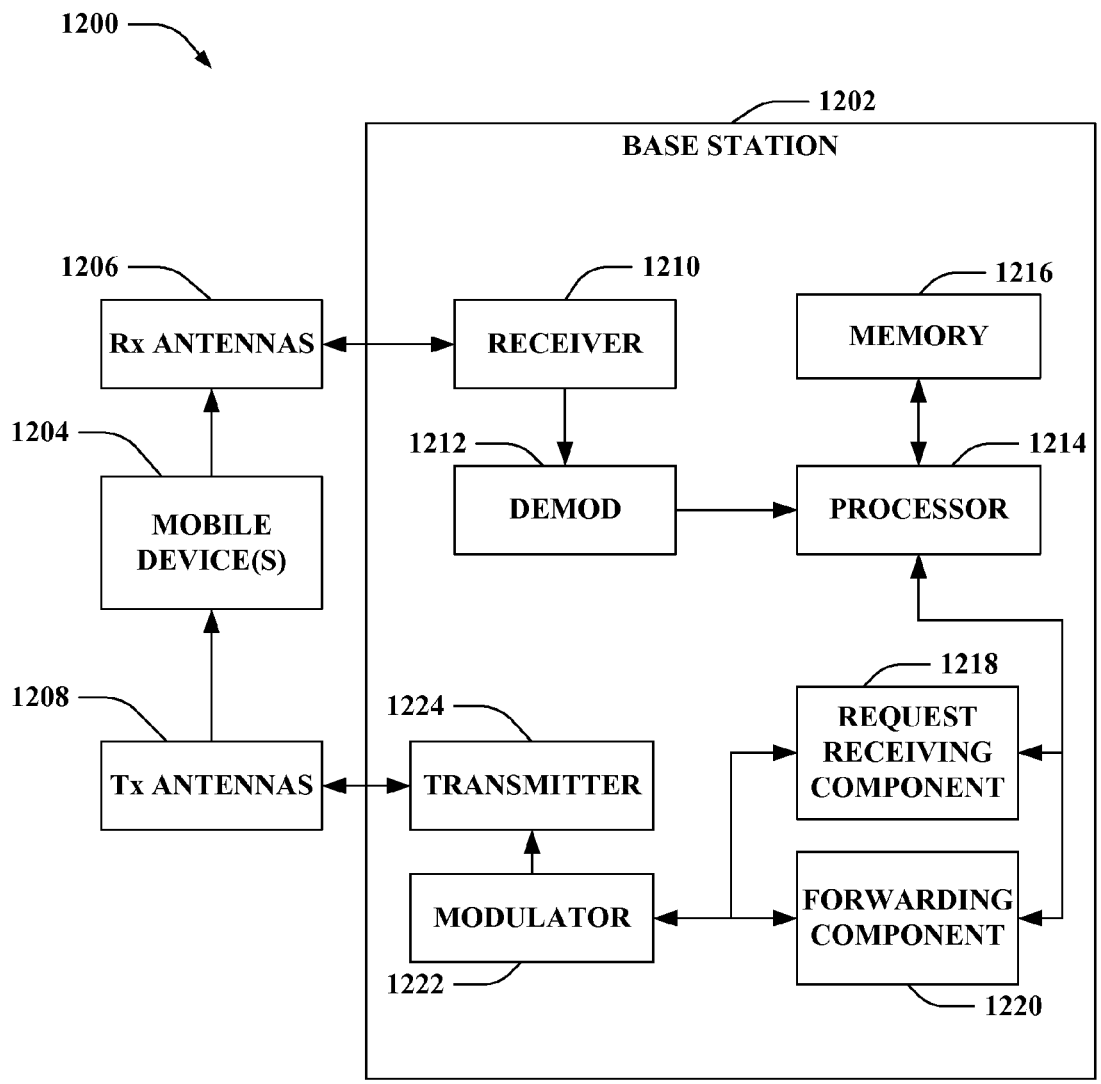
FIG. 12 is an illustration of an example system that supports multiple access modes in a wireless communication environment.

FIG. 12 is an illustration of a system 1200 that supports multiple access modes in a wireless communication environment. System 1200 comprises a base station 1202 (e.g., access point, . . . ) with a receiver 1210 that receives signal(s) from one or more mobile devices 1204 through a plurality of receive antennas 1206, and a transmitter 1224 that transmits to the one or more mobile devices 1204 through a transmit antenna 1208. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores data to be transmitted to or received from mobile device(s) 1204 and/or any other suitable information related to performing the various actions and functions set forth herein. Processor 1214 is further coupled to a request receiving component 1218 and/or a forwarding component 1220. Request receiving component 1218 can be substantially similar to request receiving component 304 of FIG. 3 and/or forwarding component 1220 can be substantially similar to forwarding component 306 of FIG. 3. Request receiving component 1218 can obtain a request from a mobile device (e.g., one of mobile device(s) 1204, . . . ) at base station 1202. It is contemplated, for instance, that request receiving component 1218 can be part of receiver 1210; however, the claimed subject matter is not so limited. Further, forwarding component 1220 can transmit the request, a CSG ID associated with base station 1202, and an access mode indicator associated with base station 1202 to a network node that effectuates at least one of access control or paging optimization. Moreover, although not shown, it is to be appreciated that base station 1202 can further include an identity advertising component, which can be substantially similar to identity advertising component 206 of FIG. 2, and/or a mode publicizing component, which can be substantially similar to mode publicizing component 208 of FIG. 2. Base station 1202 can further include a modulator 1222. Modulator 1222 can multiplex a frame for transmission by a transmitter 1224 through antennas 1208 to mobile device(s) 1204 in accordance with the aforementioned description. Although depicted as being separate from the processor 1214, it is to be appreciated that request receiving component 1218, forwarding component 1220, and/or modulator 1222 can be part of processor 1214 or a number of processors (not shown).

Figure 13:
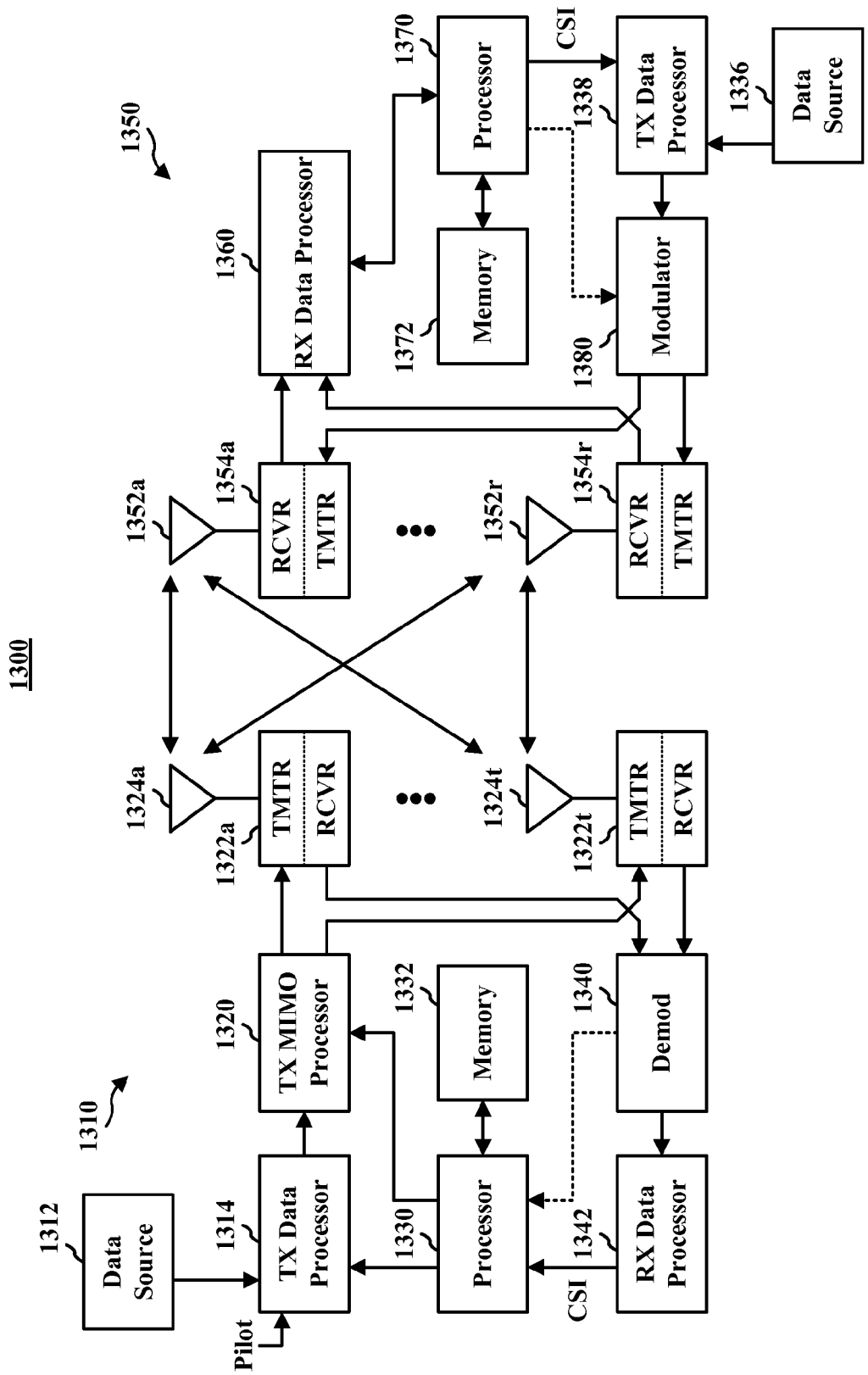
FIG. 13 is an illustration of an example wireless network environment that can be employed in conjunction with the various systems and methods described herein.

FIG. 13 shows an example wireless communication system 1300. The wireless communication system 1300 depicts one base station 1310 and one mobile device 1350 for sake of brevity. However, it is to be appreciated that system 1300 can include more than one base station and/or more than one mobile device, wherein additional base stations and/or mobile devices can be substantially similar or different from example base station 1310 and mobile device 1350 described below. In addition, it is to be appreciated that base station 1310 and/or mobile device 1350 can employ the systems (FIGS. 1-3, 5-6, 11-12 and 14-17) and/or methods (FIGS. 7-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At mobile device 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and down-converts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which precoding matrix to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from mobile device 1350 are received by antennas 1324, conditioned by receivers 1322, demodulated by a demodulator 1340, and processed by a RX data processor 1342 to extract the reverse link message transmitted by mobile device 1350. Further, processor 1330 can process the extracted message to determine which precoding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
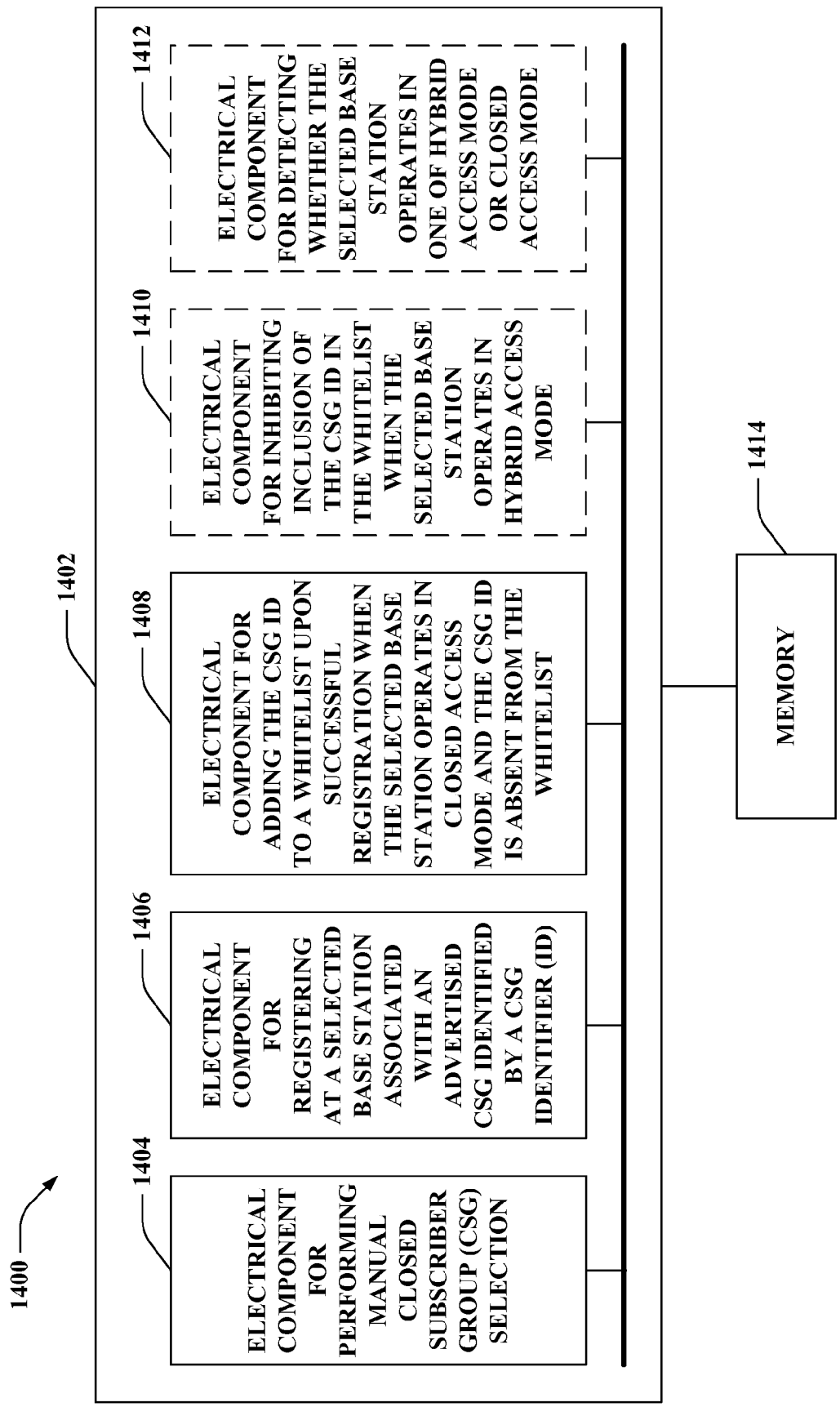
FIG. 14 is an illustration of an example system that enables updating a whitelist for a mobile device in a wireless communication environment.

With reference to FIG. 14, illustrated is a system 1400 that enables updating a whitelist for a mobile device in a wireless communication environment. For example, system 1400 can reside within a mobile device. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for performing manual Closed Subscriber Group (CSG) selection 1404. Moreover, logical grouping 1402 can include an electrical component for registering at a selected base station associated with an advertised CSG identified by a CSG Identifier (ID) 1406. Further, logical grouping 1402 can comprise an electrical component for adding the CSG ID to a whitelist upon successful registration when the selected base station operates in closed access mode and the CSG ID is absent from the whitelist 1408. Optionally, logical grouping 1402 can include an electrical component for inhibiting inclusion of the CSG ID in the whitelist when the selected base station operates in hybrid access mode 1410. Still yet, logical grouping 1402 can optionally include an electrical component for detecting whether the selected base station operates in one of hybrid access mode or closed access mode 1412. Additionally, system 1400 can include a memory 1414 that retains instructions for executing functions associated with electrical components 1404, 1406, 1408, 1410, and 1412. While shown as being external to memory 1414, it is to be understood that one or more of electrical components 1404, 1406, 1408, 1410, and 1412 can exist within memory 1414.

Figure 15:
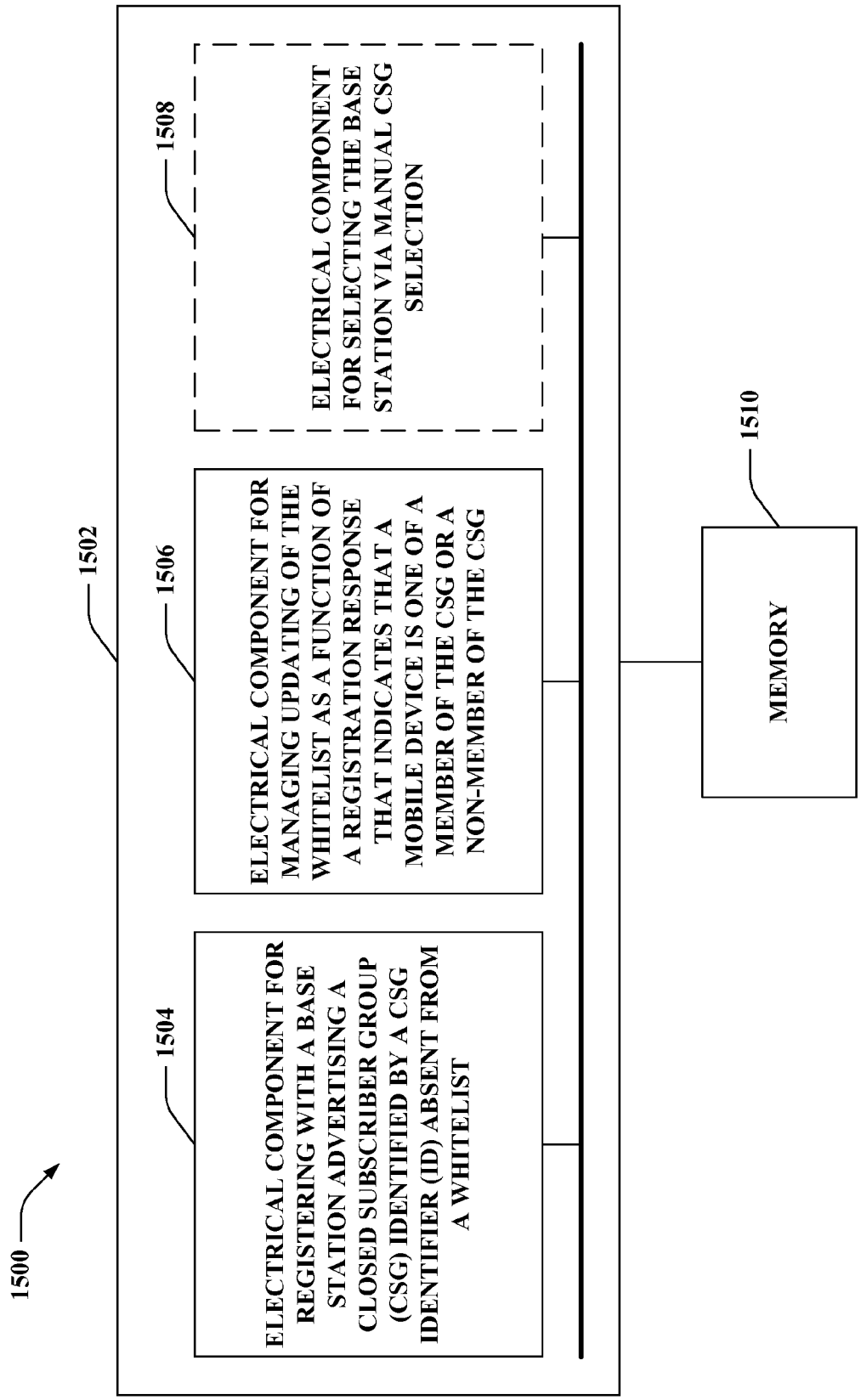
FIG. 15 is an illustration of an example system that enables managing a whitelist of a mobile device in a wireless communication environment.

With reference to FIG. 15, illustrated is a system 1500 that enables managing a whitelist of a mobile device in a wireless communication environment. For example, system 1500 can reside within a mobile device. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for registering with a base station advertising a Closed Subscriber Group (CSG) identified by a CSG Identifier (ID) absent from a whitelist 1504. Further, logical grouping 1502 can include an electrical component for managing updating of the whitelist as a function of a registration response that indicates that a mobile device is one of a member of the CSG or a non-member of the CSG 1506. As described, for example, the registration response can be an accept cause value. Moreover, logical grouping 1502 can optionally include an electrical component for selecting the base station via manual CSG selection 1508. Additionally, system 1500 can include a memory 1510 that retains instructions for executing functions associated with electrical components 1504, 1506, and 1508. While shown as being external to memory 1510, it is to be understood that one or more of electrical components 1504, 1506, and 1508 can exist within memory 1510.

Figure 16:
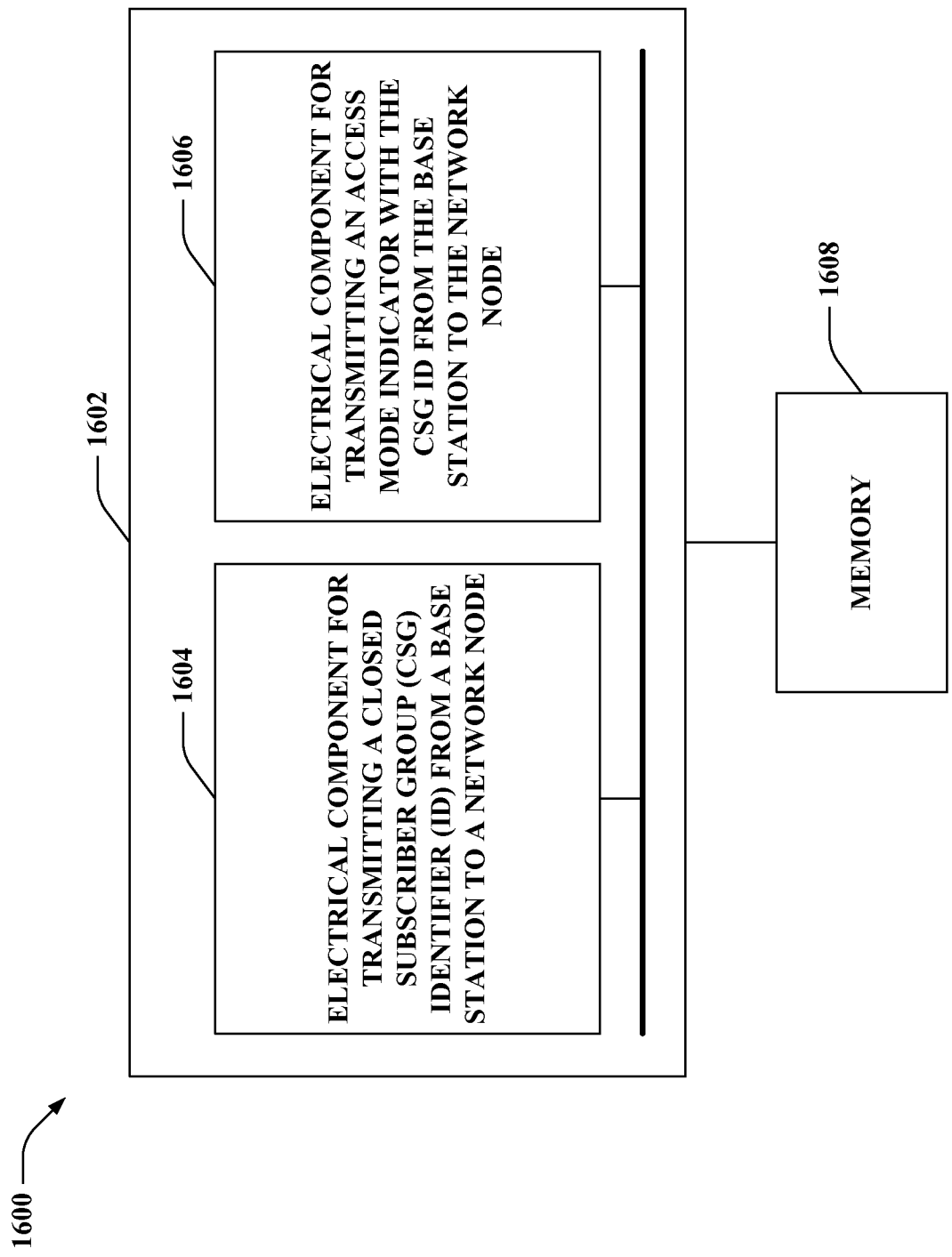
FIG. 16 is an illustration of an example system that enables supporting access control and/or paging optimization in a wireless communication environment.

With reference to FIG. 16, illustrated is a system 1600 that enables supporting access control and/or paging optimization in a wireless communication environment. For example, system 1600 can reside at least partially within a base station. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for transmitting a Closed Subscriber Group (CSG) Identifier (ID) from a base station to a network node 1604. Moreover, logical grouping 1602 can include an electrical component for transmitting an access mode indicator with the CSG ID from the base station to the network node 1606. Additionally, system 1600 can include a memory 1608 that retains instructions for executing functions associated with electrical components 1604 and 1606. While shown as being external to memory 1608, it is to be understood that one or more of electrical components 1604 and 1606 can exist within memory 1608.

Figure 17:
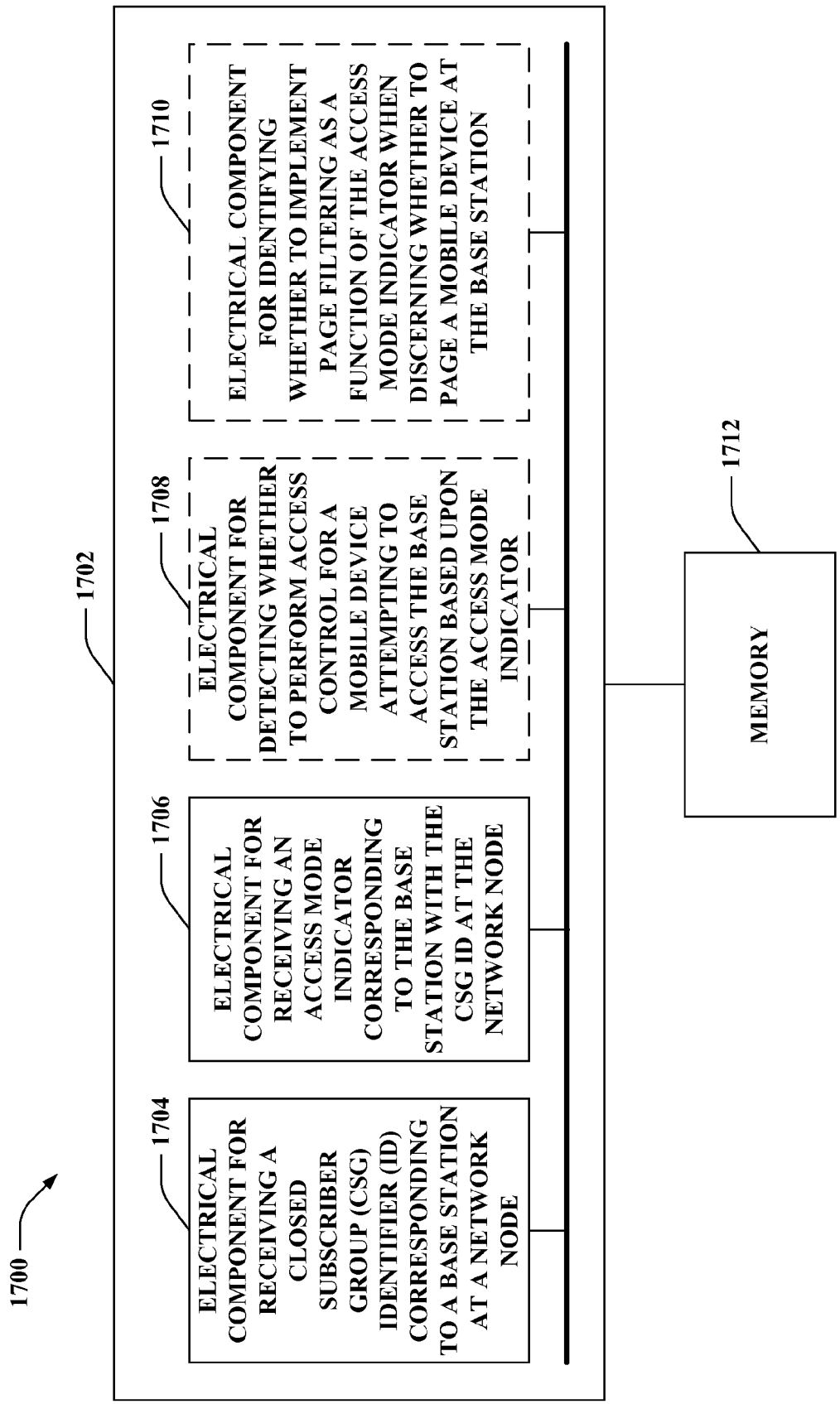
FIG. 17 is an illustration of an example system that enables implementing access control and/or paging optimization in a wireless communication environment.

With reference to FIG. 17, illustrated is a system 1700 that enables implementing access control and/or paging optimization in a wireless communication environment. For example, system 1700 can reside at least partially within a network node. The network node, for instance, can be a Mobility Management Entity (MME), a Home Evolved Node B Gateway (HeNB GW), a Home Node B Gateway (HNB GW), a Mobile Switching Center/Visitor Location Register (MSC/VLR), a Serving General Packet Radio Service (GPRS) Support Node (SGSN), or the like. It is to be appreciated that system 1700 is represented as including functional blocks, which can be functional blocks that represent functions implemented by a processor, software, or combination thereof (e.g., firmware). System 1700 includes a logical grouping 1702 of electrical components that can act in conjunction. For instance, logical grouping 1702 can include an electrical component for receiving a Closed Subscriber Group (CSG) Identifier (ID) corresponding to a base station at a network node 1704. Further, logical grouping 1702 can comprise an electrical component for receiving an access mode indicator corresponding to the base station with the CSG ID at the network node 1706. Moreover, logical grouping 1702 can optionally include an electrical component for detecting whether to perform access control for a mobile device attempting to access the base station based upon the access mode indicator 1708. Still further, logical grouping 1702 can optionally include an electrical component for identifying whether to implement page filtering as a function of the access mode indicator when discerning whether to page a mobile device at the base station 1710. Additionally, system 1700 can include a memory 1712 that retains instructions for executing functions associated with electrical components 1704, 1706, 1708, and 1710. While shown as being external to memory 1712, it is to be understood that one or more of electrical components 1704, 1706, 1708, and 1710 can exist within memory 1712.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A mobile device, comprising:
   means for performing Closed Subscriber Group (CSG) selection in response to a user selection of a base station associated with an advertised CSG identified by a CSG identifier (ID);
   means for registering at the selected base station;
   means for determining whether the selected base station is operating in a closed access mode or a hybrid access mode; and
   means for determining to add the CSG ID to a whitelist upon successful registration in response to determining the selected base station operates in the closed access mode and the CSG ID is absent from the whitelist, and determining to inhibit adding the CSG ID to the whitelist upon successful registration in response to determining the selected base station operates in the hybrid access mode and the CSG ID is absent from the whitelist.

2. The mobile device of claim 1, wherein the whitelist is at least one of an allowed CSG list or an operator CSG list.

3. The mobile device of claim 1, further comprising means for detecting whether the selected base station operates in one of the hybrid access mode or the closed access mode.

4. The mobile device of claim 3, wherein the selected base station allows access to members of the advertised CSG when operating in the closed access mode and allows access to members and non-members of the advertised CSG when operating in the hybrid access mode.

5. A method for wireless communications by a mobile device, comprising:
   performing Closed Subscriber Group (CSG) selection in response to a user selection of a base station associated with an advertised CSG identified by a CSG identifier (ID);
   registering at the selected base station;
   determining whether the selected base station is operating in a closed access mode or a hybrid access mode;
   determining to add the CSG ID to a whitelist upon successful registration in response to determining the selected base station operates in the closed access mode and the CSG ID is absent from the whitelist; and
   determining to inhibit adding the CSG ID to the whitelist upon successful registration in response to determining the selected base station operates in the hybrid access mode and the CSG ID is absent from the whitelist.

6. The method of claim 5, wherein the whitelist is at least one of an allowed CSG list or an operator CSG list.

7. The method of claim 5, further comprising detecting whether the selected base station operates in one of the hybrid access mode or the closed access mode.

8. The method of claim 7, wherein the selected base station allows access to members of the advertised CSG when operating in the closed access mode and allows access to members and non-members of the advertised CSG when operating in the hybrid access mode.

9. A mobile device for wireless communications, comprising:
   at least one processor configured to:
   perform Closed Subscriber Group (CSG) selection in response to a user selection of a base station associated with an advertised CSG identified by a CSG identifier (ID);
   register at the selected base station;
   determine whether the selected base station is operating in a closed access mode or a hybrid access mode;
   determine to add the CSG ID to a whitelist upon successful registration in response to determining the selected base station operates in the closed access mode and the CSG ID is absent from the whitelist; and
   determine to inhibit adding the CSG ID to the whitelist upon successful registration in response to determining the selected base station operates in the hybrid access mode and the CSG ID is absent from the whitelist; and
   a memory coupled to the at least one processor.

10. The mobile device of claim 9, wherein the whitelist is at least one of an allowed CSG list or an operator CSG list.

11. The mobile device of claim 9, wherein the at least one processor is further configured to detect whether the selected base station operates in one of the hybrid access mode or the closed access mode.

12. The mobile device of claim 11, wherein the selected base station allows access to members of the advertised CSG when operating in the closed access mode and allows access to members and non-members of the advertised CSG when operating in the hybrid access mode.

13. A non-transitory computer-readable medium storing software code which when executed by at least one processor causes a mobile device to:
   perform Closed Subscriber Group (CSG) selection in response to a user selection of a base station associated with an advertised CSG identified by a CSG identifier (ID);
   register at the selected base station;
   determine whether the selected base station is operating in a closed access mode or a hybrid access mode;
   determine to add the CSG ID to a whitelist upon successful registration in response to determining the selected base station operates in the closed access mode and the CSG ID is absent from the whitelist; and
   determine to inhibit adding the CSG ID to the whitelist upon successful registration in response to determining the selected base station operates in the hybrid access mode and the CSG ID is absent from the whitelist.

14. The computer-readable medium of claim 13, wherein the whitelist is at least one of an allowed CSG list or an operator CSG list.

15. The computer-readable medium of claim 13, further comprising code for detecting whether the selected base station operates in one of the hybrid access mode or the closed access mode.

16. The computer-readable medium of claim 15, wherein the selected base station allows access to members of the advertised CSG when operating in the closed access mode and allows access to members and non-members of the advertised CSG when operating in the hybrid access mode.

* * * * *